(12) United States Patent
O'Sullivan

(10) Patent No.: US 10,845,268 B1
(45) Date of Patent: Nov. 24, 2020

(54) MONITORABLE HOLLOW CORE OPTICAL FIBER

(71) Applicant: Maurice O'Sullivan, Ottawa (CA)

(72) Inventor: Maurice O'Sullivan, Ottawa (CA)

(73) Assignee: CIENA CORPORATION, Hanover, MD (US)

( * ) Notice: Subject to any disclaimer, the term of this patent is extended or adjusted under 35 U.S.C. 154(b) by 0 days.

(21) Appl. No.: 16/429,919

(22) Filed: Jun. 3, 2019

(51) Int. Cl.
*G01M 11/02* (2006.01)
*G02B 6/02* (2006.01)
(Continued)

(52) U.S. Cl.
CPC .... *G01M 11/0207* (2013.01); *G01M 11/3109* (2013.01); *G01M 11/336* (2013.01);
(Continued)

(58) Field of Classification Search
CPC ............. G01M 11/02; G01M 11/0207; G01M 11/088; G01M 11/30; G01M 11/31; G01M 11/3109; G01M 11/3118; G01M 11/3127; G01M 11/3136; G01M 11/3145; G01M 11/3154; G01M 11/3163; G01M 11/3172; G01M 11/3181; G01M 11/319; G01M 11/33; G01M 11/331; G01M 11/332; G01M 11/333; G01M 11/334; G01M 11/335; G01M 11/336; G01M 11/337; G01M 11/338; G01M 11/39; G02B 6/02995; G02B 6/023; G02B 6/02314; G02B 6/0219; G02B 6/02323; G02B 6/02328; G02B 6/3801; G02B 6/02376; G02B 6/02357; G02B 6/02295; G01K 11/32;
(Continued)

(56) References Cited

U.S. PATENT DOCUMENTS

| 5,698,848 A | * | 12/1997 | Belk | .................. | G01D 5/35383 |
| | | | | | 250/227.11 |
| 6,795,635 B1 | * | 9/2004 | Fajardo | ............... | C03B 37/0122 |
| | | | | | 385/100 |

(Continued)

OTHER PUBLICATIONS

"Corning TXF Optical Fiber Product Information", Corning Incorporated, 2017.

(Continued)

*Primary Examiner* — Gordon J Stock, Jr.
(74) *Attorney, Agent, or Firm* — Integral Intellectual Property Inc.; Amy Scouten; Miriam Paton

(57) ABSTRACT

A monitorable hollow core (HC) optical fiber comprises one or more hollow core anti-resonant fiber (HC-ARF) segments and one or more monitoring segments alternatingly connected with the HC-ARF segments, and where each monitoring segment comprises one or more non-HC-ARF constituents. A method for monitoring a monitorable HC optical fiber comprises transmitting one or more first optical signals on the monitorable HC optical fiber, detecting one or more second optical signals on the monitorable HC optical fiber, and monitoring one or more optical properties of the monitorable HC optical fiber using the first optical signals and the second optical signals, where the monitoring is enabled as a result of interactions between the first optical signals and the non-HC-ARF constituents of the monitoring segments.

20 Claims, 11 Drawing Sheets

(51) Int. Cl.
*G01M 11/00* (2006.01)
*G02B 6/38* (2006.01)

(52) U.S. Cl.
CPC ....... *G01M 11/337* (2013.01); *G02B 6/02304* (2013.01); *G02B 6/02328* (2013.01); *G02B 6/3801* (2013.01)

(58) Field of Classification Search
CPC ....... G01K 11/3206; G01L 1/24; G01L 1/241; G01L 1/242; G01L 1/243; G01L 1/245; G01L 1/246; G01L 1/247; G01L 1/248; G01D 5/353; G01D 5/35338; G01D 5/35341; G01D 5/35345; G01D 5/35348; G01D 5/35351; G01D 5/35354; G01D 5/35358; G01D 5/35361; G01D 5/35364; G01D 5/35367; G01D 5/3537; G01D 5/35374; G01D 5/35377; G01D 5/3538; H04B 10/07; H04B 10/071; H04B 10/073; H04B 10/0731; H04B 10/0795; H04B 10/07951; H04B 10/07953; H04B 10/07955; H04B 10/07957; H04B 10/2525
USPC ............... 356/32–34, 35.5, 73.1; 385/12, 13, 385/123–128; 398/9–38; 250/227.14, 250/227.15, 227.16, 227.17, 227.18, 250/227.19
See application file for complete search history.

(56) References Cited

U.S. PATENT DOCUMENTS

| | | | | |
|---|---|---|---|---|
| 9,240,262 B1* | 1/2016 | Challener | ............... | G01L 1/246 |
| 9,791,619 B2* | 10/2017 | Challener | .......... | G02B 6/02366 |
| 9,960,843 B2 | 5/2018 | Shiner et al. | | |
| 2009/0080844 A1* | 3/2009 | Mukasa | ............. | G02B 6/02342 |
| | | | | 385/124 |
| 2009/0220186 A1* | 9/2009 | Jin | ..................... | G02B 6/02376 |
| | | | | 385/11 |
| 2011/0267612 A1* | 11/2011 | Roberts | ............. | G02B 6/02328 |
| | | | | 356/301 |
| 2012/0219301 A1* | 8/2012 | Koch, III | .......... | H04B 10/2581 |
| | | | | 398/142 |
| 2014/0111789 A1* | 4/2014 | Carralero | ............... | G01D 5/266 |
| | | | | 356/35.5 |
| 2017/0160467 A1* | 6/2017 | Poletti | .................... | G02B 6/255 |
| 2018/0031413 A1* | 2/2018 | Stokely | .................. | E21B 47/00 |
| 2020/0188036 A1* | 6/2020 | Ding | ...................... | A61B 34/20 |

OTHER PUBLICATIONS

Belardi, "Design and properties of hollow antiresonant fibers for the visible and near infrared spectra range", Journal of Lightwave Technology, vol. 33, Issue 21, pp. 4497-4503, 2015.

Bradley, et al., "Modal content in hypocycloid Kagome hollow core photonic crystal fibers", Optical Society of America, vol. 24, Issue 14, Jul. 11, 2016.

Bradley, et al., "Record Low-Loss 1.3dB/km Data Transmitting Antiresonant Hollow Core Fibre", 2018 European Conference on Optical Communication, 2018.

Buczynski, "Photonic Crystal Fibers", Proceedings of the XXXIII International School of Semiconducting Compounds, Jaszowiec, vol. 106, No. 2, 2004.

Buet, et al., "Nondestructive Measurement of the Roughness of the Inner Surface of Hollow Core-Photonic Bandgap Fibers", Optics Letters, vol. 41, Issue 21, Nov. 1, 2016.

Chen, et al., "Demonstration of a Wide Bandwidth, Low Loss Hollow Core Photonic Bandgap Fiber in the 1.55 um Wavelength Region", 5th Workshop on Specialty Optical Fiber and Their Applications, Oct. 11, 2017.

Hayes, et al., "Antiresonant Hollow Core Fiber with Octave Spanning Bandwidth for Short Haul Data Communications", Journal of Lightwave Technology, 1-5, DOI: 10.5258/SOTON/397853, 2016.

Hayes, et al., "Antiresonant Hollow Core Fiber with Octave Spanning Bandwidth for Short Haul Data Communications", 2016 Optical Fiber Communications Conference and Exhibition, Mar. 20, 2016.

Jasion, et al., "Novel Antiresonant Hollow Core Fiber Design with Ultralow Leakage Loss Using Transverse Power Flow Analysis", Optical Fiber Communications Conference and Exhibition 2019.

Kim, et al., "Free Space based Hollow Core Fiber Interconnection and Associated In-Line Components", Optical Fiber Communications Conference and Exhibition 2019.

Kuschnerov, et al., "Data Transmission through up to 74.8 km of Hollow-Core Fiber with Coherent and Direct-Detect Transceivers", European Conference on Optical Communication 2015, ID: 0049, Sep. 27, 2015.

Kuschnerov, et al., "Transmission of Commercial Low Latency Interfaces Over Hollow-Core Fiber", Journal of Lightwave Technology, vol. 34, No. 2, Jan. 15, 2016.

Mangan, et al., "Low loss (1.7 dB/km) hollow core photonic bandgap fiber", Optical Fiber Communications Conference, 2004, Feb. 23, 2004.

Mousavi, et al., "Broadband high birefringence and polarizing hollow core antiresonant fibers", Optics Express, vol. 24, No. 20, Oct. 3, 2016.

Nawazuddin, et al., "Lotus Shaped Negative Curvature Hollow Core Fiber with 10.5 dB/km at 1550 nm Wavelength", Journal of Lightwave Technology, vol. 36, Issue 5, Mar. 1, 2018.

Poletti, "Nested antiresonant nodeless hollow core fiber", Optics Express, vol. 22, Issue 20, pp. 23807-23828, 2014.

Ravaille, et al., "In-situ measurement of backscattering in hollow-core fiber based resonant cavities", IEEE Photonics Journal, 1-5, DOI:10.1109/JPHOT.2017.2713441, 2017.

Richardson, "New optical fibres for high-capacity optical communications", Philosophical Transactions of the Royal Society A 374: 20140441, Feb. 4, 2016.

Slavik, et al., "Ultralow Thermal Sensitivity of Phase and Propagation Delay in Hollow-Core Fibres", 2017 European Conference on Optical Communications, Sep. 17, 2017.

Wheeler, et al., "Low Loss Kagome Hollow Core Fibers Operating from the Near- to the Mid-IR", Optics Letters, vol. 42, Issue 13, Jul. 1, 2017.

* cited by examiner

MONITORABLE HOLLOW CORE OPTICAL FIBER

TECHNICAL FIELD

This document relates to the technical field of optical communications.

BACKGROUND

An optical communications system or network may comprise one or more links, where a given link connects a transmitter to a receiver by one or more optical fibers. Each link may comprise one or more spans, where a given span comprises a length of fiber and one or more optical amplifiers used to compensate for the attenuation loss in that span.

Conventional optical fibers generally have a solid core made of glass or plastic.

SUMMARY

According to a broad aspect, a monitorable hollow core (HC) optical fiber apparatus comprises one or more monitorable HC optical fibers configured to transmit optical signals. Each monitorable HC optical fiber comprises one or more hollow core anti-resonant fiber (HC-ARF) segments and one or more monitoring segments alternatingly connected with the HC-ARF segments, where each monitoring segment comprises one or more non-HC-ARF constituents and enables monitoring of one or more optical properties of the monitorable HC optical fiber using interactions between one or more of the optical signals and the one or more non-HC-ARF constituents.

According to some examples, a quantity and respective properties of the one or more monitoring segments are selected such that a sum of propagation losses and connection losses incurred in each monitorable HC optical fiber is lower than an expected propagation loss of a conventional solid core (SC) optical fiber having a length identical to a length of the monitorable HC optical fiber.

According to some examples, the one or more optical properties are monitorable using optical time domain reflectometry (OTDR) measurements or pump-probe measurements or both.

According to some examples, the one or more optical properties comprise one or more of scatter, loss, wavelength-dependent power, wavelength-dependent dispersion, polarization-dependent loss (PDL), and polarization-mode dispersion (PMD).

According to some examples, each monitorable HC optical fiber comprises a plurality of the monitoring segments enabling monitoring of the one or more optical properties at a respective plurality of different locations in the monitorable HC optical fiber.

According to some examples, at least one of the monitoring segments comprises a plurality of transition subsegments, each transition subsegment having a different mode field radius (MFR).

According to some examples, the monitorable HC optical fiber apparatus comprises a plurality of the monitorable HC optical fibers and a protective conduit housing the plurality of monitorable HC optical fibers.

According to some examples, the monitorable HC optical fiber apparatus comprises one or more optical amplifiers configured to amplify the optical signals transmitted on the one or more monitorable HC optical fibers.

According to some examples, at least one of the monitorable HC optical fibers comprises a proximal monitoring segment located at a proximal end of the monitorable HC optical fiber and a distal monitoring segment located at a distal end of the monitorable HC optical fiber, wherein an output of one of the optical amplifiers is connected to the proximal monitoring segment, and wherein an input of another one of the optical amplifiers is connected to the distal monitoring segment.

According to another broad aspect, a method for monitoring a monitorable HC optical fiber comprises transmitting one or more first optical signals on the monitorable HC optical fiber, where the monitorable HC optical fiber comprises one or more HC-ARF segments and one or more monitoring segments alternatingly connected with the HC-ARF segments, and where each monitoring segment comprising one or more non-HC-ARF constituents. The method comprises, responsive to transmitting the one or more first optical signals, detecting one or more second optical signals on the monitorable HC optical fiber, where the one or more second optical signals are primarily dependent on interactions between the one or more first optical signals and the non-HC-ARF constituents of the monitoring segments. The method comprises monitoring one or more optical properties of the monitorable HC optical fiber using the one or more first optical signals and the one or more second optical signals.

According to some examples, a quantity and respective properties of the one or more monitoring segments are selected such that a sum of propagation losses and connection losses incurred in the monitorable HC optical fiber is lower than an expected propagation loss of a conventional SC optical fiber having a length identical to a length of the monitorable HC optical fiber.

According to some examples, the one or more optical properties are monitorable using OTDR measurements According to some examples, the monitoring method comprises comparing OTDR measurements taken at two or more different times.

According to some examples, the one or more optical properties are monitorable using pump-probe measurements.

According to some examples, the one or more optical properties comprise one or more of scatter, loss, wavelength-dependent power, wavelength-dependent dispersion, PDL, and PMD.

According to some examples, the monitorable HC optical fiber comprises a plurality of the monitoring segments enabling monitoring of the one or more optical properties at a respective plurality of different locations in the monitorable HC optical fiber.

According to another broad aspect, a method for manufacturing a monitorable HC optical fiber apparatus comprises providing one or more HC-ARF segments of a monitorable HC optical fiber, providing one or more monitoring segments of the monitorable HC optical fiber, where each monitoring segment comprises one or more non-HC-ARF constituents, and alternatingly connecting the HC-ARF segments to the monitoring segments to form the monitorable HC optical fiber, where one or more optical properties of the monitorable HC optical fiber are monitorable using interactions between one or more optical signals transmitted on the monitorable HC optical fiber and the non-HC-ARF constituents of the monitoring segments.

According to some examples, the manufacturing method comprises selecting a quantity and respective properties of the monitoring segments such that a sum of propagation losses and connection losses incurred in the monitorable HC optical fiber is lower than an expected propagation loss of a conventional SC optical fiber having a length identical to a length of the monitorable HC optical fiber.

According to some examples, the connecting comprises mechanical splicing.

According to some examples, the manufacturing method comprises forming at least one of the monitoring segments by connecting together a plurality of transition subsegments, each transition subsegment having a different MFR.

DETAILED DESCRIPTION

Figure 1:
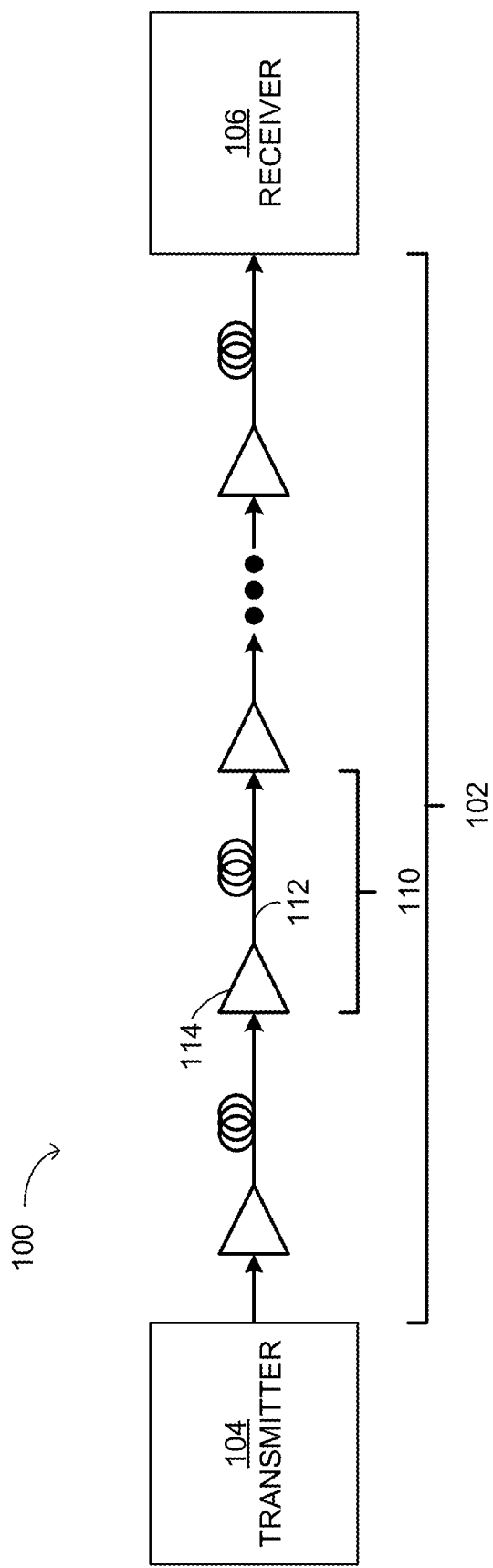
FIG. 1 illustrates an optical communications system in accordance with some examples of the technology disclosed herein.

FIG. 1 illustrates an optical communications system or network 100, in accordance with some examples of the technology disclosed herein.

The optical communications system 100 may include one or more links, such as a link 102 between a transmitter 104 and a receiver 106. One or both of the transmitter 104 and receiver 106 may operate as a transceiver capable of transmitting and receiving signals. One or both of the transmitter 104 and the receiver 106 may comprise a coherent modem. Although not explicitly illustrated in FIG. 1, the optical communications system 100 may comprise additional transmitters, additional receivers, and additional links, as well as means for multiplexing and demultiplexing multiple optical channels.

Each link in the communications system 100 may comprise one or more spans, where a span may comprise a length of optical fiber and one or more optical amplifiers, such as erbium-doped fiber amplifiers (EDFAs), multi-stage EDFAs, hybrid EDFA/Raman amplifiers, and the like. For example, the link 102 comprises the span 110, which comprises an optical amplifier 114 and a length of optical fiber 112. The optical amplifier 114 may be used to compensate for the attenuation loss in the length of optical fiber 112. Although not explicitly illustrated, other elements may be present in the optical communications system 100, such as wavelength selective switches, optical multiplexers, optical de-multiplexers, optical filters, and the like. The link may support simultaneous transmission of more than one modulated optical carrier on any span.

The optical fiber 112 comprised in each span 110 typically has a solid core made of glass. Examples of fiber types include are described in, but not restricted to the International Telecommunication Union (ITU) standards G651.1, G.652, G.653, G.654, G.655, G.656, G.657 and the like. The amount of attenuation loss in a length of fiber may depend on the fiber type(s) that make up that length.

Figure 2:
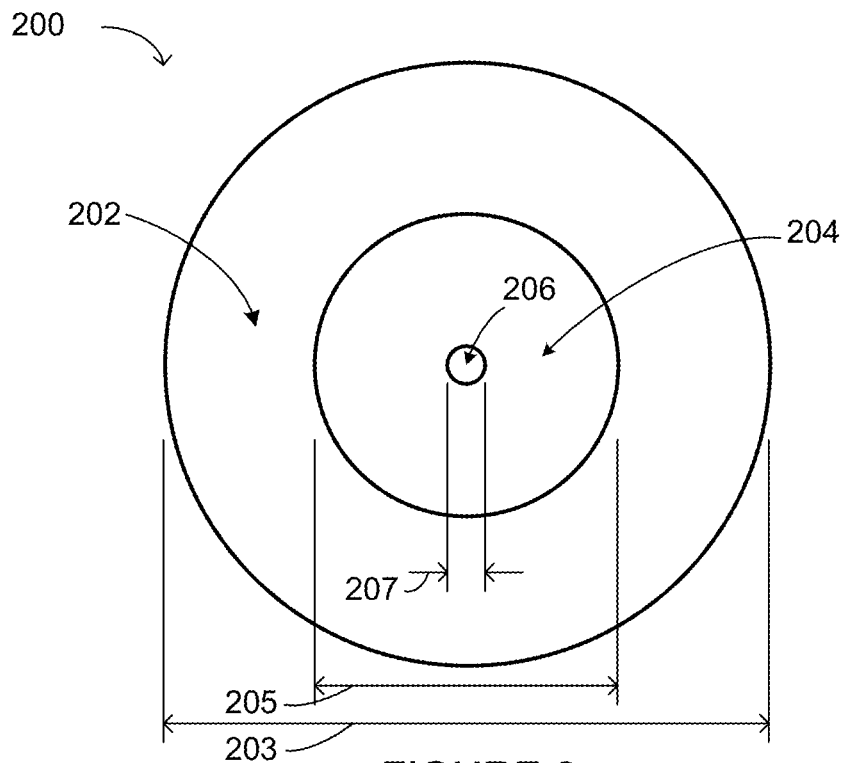
FIG. 2 illustrates a cross section of a conventional optical fiber in accordance with some examples of the prior art.

FIG. 2 illustrates a cross section of a conventional optical fiber 200, in accordance with some examples of the prior art.

The optical fiber 200 comprises a coating 202, a cladding 204, and a core 206. An outer diameter of the coating 202 is denoted by 203. An outer diameter of the cladding 204 is denoted by 205. An outer diameter of the core 206 is denoted by 207.

According to some examples, the outer diameter 203 of the coating 202 may be on the order of 250 µm, and the outer diameter 205 of the cladding 204 may be on the order of 125 µm. Where the optical fiber 200 is a single mode fiber, the diameter 207 of the core 206 may be on the order of 3 µm to 10 µm. Where the optical fiber 200 is a multi-mode fiber, the outer diameter 207 of the core 206 may be on the order of 50 µm to 1500 µm.

According to some examples, the coating 202 may comprise one or more coats of a plastic material to protect the optical fiber 200 from its environment. A metallic sheath (not shown) may also be added to coating 202 to provide further physical protection.

According to some examples, both the cladding 204 and the core 206 may comprise solid glass, but with the core 206 being distinguished from the cladding 204 by virtue of a slightly higher effective index of refraction. For example, the core 206 may have an index of refraction that is on the order of 0.3% to 1% higher than the index of refraction of the surrounding cladding 204. According to some examples, the index of refraction may vary within the core 206 as a function of the distance from the center of the core 206. A profile for the index of refraction within the core 206 may be selected such that the expectation of the index over the mode intensity profile is an effective index that has certain desired waveguide properties for different wavelengths. The higher effective index of refraction of the core 206 may be achieved by the addition of a dopant. For example, the cladding 204 and the core 206 may comprise silicon dioxide having an index of refraction of 1.45 at 1.5 microns, while the core 206 may additionally comprise germanium, which results in an index of refraction of 1.46. It is this compositional change caused by the dopant, and the resulting difference in the index of refraction between the cladding 204 and the core 206, that causes the cladding 204 and the core 206 to act, together, as a waveguide for light transmitted on the optical fiber 200. The glass structure of the cladding 204 and the core 206 causes the light to scatter in all directions, but most of the energy and intensity of the light is confined to the core 206, and there is little penetration of the light into the cladding 204.

A micro-structured optical fiber (MOF) generally has a cladding formed from a micro-structure comprising an arrangement of air holes separated by glass membranes. The glass membranes may be arranged in a variety of ways, such that the air holes may be periodic or non-periodic. In some examples, the cladding may comprise a plurality of glass tubes. In other examples, the cladding may comprise a lattice of thin glass struts which are interconnected at nodes, such that a cross section of the fiber exhibits a cladding having the appearance of a honeycomb. Depending on the arrangement of membranes or tubes within the cladding, light is confined primarily to the core in one of two different ways: (1) constructive interference of scattered light (including the photonic bandgap effect); or (2) total internal reflection. Together, the cladding and the core form a waveguide for light transmitted on the MOF.

In a conventional optical fiber, such as the fiber 200, the core generally consists of a solid material, such as glass or plastic. Such fibers may be referred to as solid core (SC) optical fibers. The primary sources of propagation loss in a SC optical fiber are scattering and absorption due to interactions between the light transmitted on the SC optical fiber and the solid material comprised in the waveguide. The amount of scattering is dependent on the wavelength of transmission as well as uniformity and size of the effective refractive index of the medium through which the light is being transmitted. A vacuum or a gas medium has refractive index that is significantly lower than that of a solid medium. Thus, reduced scattering may be achieved by replacing the solid material of the core with a vacuum or a gas, such as air.

An optical fiber that does not comprise a solid core may herein be referred to as a hollow core (HC) optical fiber. Hollow core micro-structured optical fibers (HC-MOFs) have garnered particular interest due to their potential for high propagation speeds, low propagation loss, and low non-linearity. This is in contrast to conventional SC optical fibers, which exhibit four wave mixing (FWM) and nonlinearities caused by Raman scattering and stimulated Brillouin scattering (SBS) that limit usable transmission light intensities and, consequently, the achievable received signal quality.

HC-MOFs that rely on the photonic bandgap effect to confine light within the hollow core may be referred to as hollow core photonic bandgap fibers (HC-PBGFs) or hollow core photonic crystal fibers (HC-PCFs). The cladding of a HC-PBGF may comprise an outer cladding and an inner cladding. The outer cladding may be comprised substantially of solid glass, while the inner cladding may comprise a lattice of glass walls or struts which intersect at nodes. According to one example, excluding the coating, the outer cladding may cover approximately 50% of the fiber cross section, the inner cladding may cover approximately 40% of the fiber cross section, and the hollow core may cover the remaining 10% of the fiber cross section. However, many other HC-PBGF structures are possible. At frequencies within the air bandgap, the light is anti-resonant with the nodes in the inner cladding and is therefore radially back-scattered to the core. As a result, there is very little radiation leakage from the core. Instead, loss in HC-PBGFs is primarily due to surface scattering loss (SSL) from the air-glass interfaces formed by the struts. HC-PBGFs are described in more detail, for example, by Mangan et al. in "Low loss (1.7 dB/km) hollow core photonic bandgap fiber", *Optical Fiber Communications Conference*, 2004; by Buczynski in "Photonic Crystal Fibers", *Proceedings of the XXXIII International School of Semiconducting Compounds*, Jaszowiec, Vol. 106, No. 2, 2004; by Kuschnerov et al. in "Data Transmission through up to 74.8 km of Hollow-Core Fiber with Coherent and Direct-Detect Transceivers", *European Conference on Optical Communication* 2015, ID: 0049, 2015; by Kuschnerov et al. in "Transmission of Commercial Low Latency Interfaces Over Hollow-Core Fiber", *Journal of Lightwave Technology*, Vol. 34, No. 2, 2016; by Buet et al. in "Nondestructive Measurement of the Roughness of the Inner Surface of Hollow Core-Photonic Bandgap Fibers", *Optics Letters*, Vol. 41, Issue 21, 2016; by Chen et al. in "Demonstration of a Wide Bandwidth, Low Loss Hollow Core Photonic Bandgap Fiber in the 1.55 um Wavelength Region", *5th Workshop on Specialty Optical Fiber and Their Applications*, 2017; by Kim et al. in "Free Space based Hollow Core Fiber Interconnection and Associated In-Line Components", *Optical Fiber Communications Conference and Exhibition* 2019; and by Slavik et al. in "Ultralow Thermal Sensitivity of Phase and Propagation Delay in Hollow-Core Fibres", 2017 *European Conference on Optical Communications*, 2017.

HC-MOFs that rely on total internal reflection to confine light within the hollow core may be referred to as hollow core anti-resonant fibers (HC-ARFs). The cladding of a HC-ARF typically comprises an arrangement of glass membranes forming a bank of partial reflections which confine light primarily to the hollow core. The micro-structure may be designed such that light is anti-resonant with the glass membranes, and the light intensity is minimized at the air-glass interfaces. Therefore, in contrast to HC-PBGFs, HC-ARFs may exhibit very low SSL. However, performance of HC-ARFs may be limited by radiation leakage or confinement loss (CL).

Figure 3:
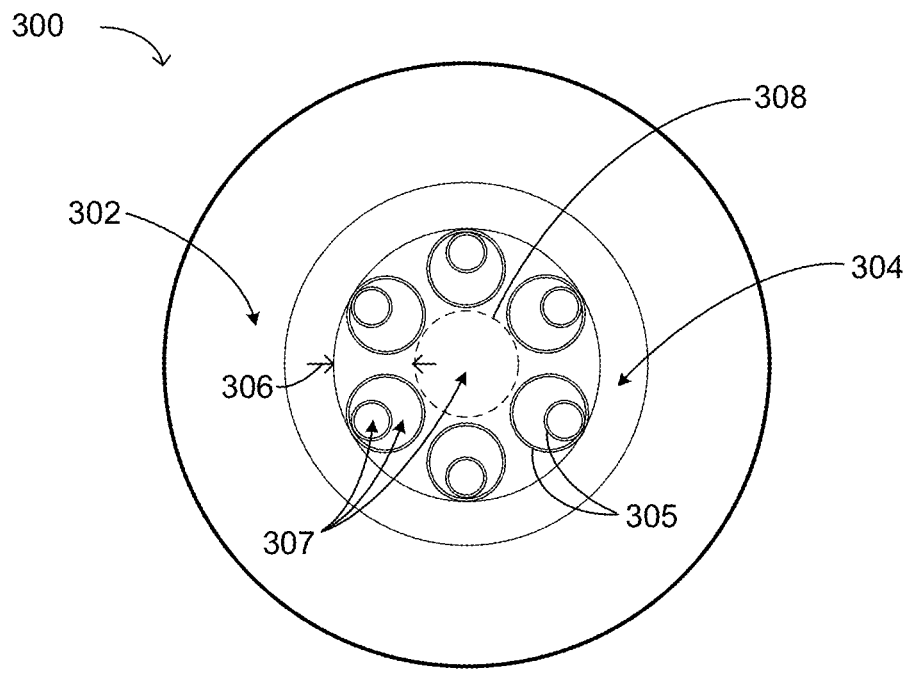
FIG. 3 illustrates a cross section of a hollow core anti-resonant fiber (HC-ARF) in accordance with some examples of the prior art.

FIG. 3 illustrates a cross section of a HC-ARF 300, in accordance with some examples of the prior art.

Similarly to the optical fiber 200, the HC-ARF 300 comprises a coating 302, which may comprise one or more coats of a plastic material to protect the HC-ARF 300 from its environment. However, in place of the cladding 204 and the core 206, the HC-ARF 300 instead comprises an outer cladding 304, an inner cladding (denoted by the annular region 306), and a hollow core 308. The inner cladding 306 comprises a plurality of glass tubes 305 which are filled with and surrounded by a medium 307 such as air, a noble gas, a vacuum, or some other suitable medium, and are arranged in a regular configuration as an anti-resonant structure. According to some examples, the composition of the outer cladding 304 may be the same as or similar to the compositions of the glass tubes 305. According to other examples, the outer cladding 304 may be composed of a different material than the glass tubes 305. The arrangement of the glass tubes 305 confines light within a central region of the fiber, such that a waveguide is formed which is predominantly comprised of the medium 307, while excluding light from the arrangement of glass tubes 305 and the non-air regions of the fiber (i.e., the outer cladding 304). The glass tubes 305 operate by coherent extinction to exclude light from their formation, thereby confining the light to the waveguide.

The terms "inner cladding" and "outer cladding" are used herein for ease of explanation of the general structure of an example HC-ARF, and should not be construed as necessarily limiting. Furthermore, the HC-ARF 300 represents merely one example configuration for a HC-ARF. Many other configurations are possible. Examples of HC-ARF designs are described in more detail, for example, by Mousavi et al. in "Broadband high birefringence and polarizing hollow core antiresonant fibers", *Optics Express*, Vol. 24, No. 20, 2016; by Nawazuddin et al. in "Lotus Shaped Negative Curvature Hollow Core Fiber with 10.5 dB/km at 1550 nm Wavelength", *Journal of Lightwave Technology*, Vol. 36, Issue 5, 2018; by Bradley et al. in "Modal content in hypocycloid Kagome hollow core photonic crystal fibers", *Optical Society of America*, Vol. 24, Issue 14, 2016; by Hayes et al. in "Antiresonant Hollow Core Fiber with Octave Spanning Bandwidth for Short Haul Data Communications", in *Optical Fiber Communications Conference and Exhibition*, 2016; by Hayes et al. in "Antiresonant Hollow Core Fiber with Octave Spanning Bandwidth for Short Haul Data Communications", *Journal of Lightwave Technology*, 1-5, DOI: 10.5258/SOTON/397853, 2016; by Richardson et al. in "New optical fibres for high-capacity optical communications", *Philosophical Transactions of the Royal Society A* 374: 20140441, 2016; by Wheeler et al. in "Low Loss Kagome Hollow Core Fibers Operating from the Near- to the Mid-IR", *Optics Letters*, Vol. 42, Issue 13, 2017; and by Ravaille et al. in "In-situ measurement of backscattering in hollow-core fiber based resonant cavities", *IEEE Photonics Journal*, 1-5, DOI:10.1109/JPHOT.2017.2713441, 2017.

Until relatively recently, HC-ARFs had been considered inherently lossier than HC-PBGFs due to the dominance of radiation leakage. However, with recent advances in the design of HC-ARFs, these losses have been significantly reduced, to the extent that some HC-ARFs have been shown to have faster propagation speeds than conventional SC optical fibers and, theoretically, to have fundamentally lower loss than conventional SC optical fibers.

For example, in "Record Low-Loss 1.3 dB/km Data Transmitting Antiresonant Hollow Core Fibre", *European Conference on Optical Communication*, 2018, Bradley et al. reported a Nested Antiresonant Nodeless Fiber (NANF) exhibiting a loss of 1.3 dB/km at 1450 nm, the lowest documented loss for any HC-MOF. In "Novel Antiresonant Hollow Core Fiber Design with Ultralow Leakage Loss Using Transverse Power Flow Analysis", *Optical Fiber Communications Conference and Exhibition*, 2019, Jasion et al. reported an anti-resonant leakage inhibited fiber (ALIF) having a SSL of 0.15 dB/km, and a CL of 0.003 dB/km, which is effectively negligible compared to the SSL. Furthermore, Jasion et al. reported a loss approaching 0.01 dB/km in the third telecommunication window, namely, for wavelengths in the range of 1500 nm to 1600 nm.

HC-ARFs hold the prospect of radical improvement to the reach and/or capacity vis-a-vis conventional SC optical fibers on three fronts. Firstly, lower loss and lower nonlinearity may offer higher received signal quality at any given transmission intensity. Secondly, linear transmission effectively removes limits on transmission intensity, thereby providing for higher received signal quality by means of higher transmission intensity. Thirdly the wavelength window of low loss can be more than two times wider in HC-ARF, allowing double the throughput of SC fiber.

The use of HC-ARFs in place of conventional SC optical fibers may be valuable in numerous applications. For example, high-speed trading on the stock market is dependent on the relative transaction delays of competing transactions. The ability to reduce a transaction delay by several nanoseconds through the use of a HC-ARF may have a high monetary value. In another application, the use of HC-ARFs may be valuable for communication between data centers. For example, the physical distance between data centers may be limited by the propagation delay of optical communications between the data centers. If the data centers are located too far apart from one another, issues such as timing jitter may pose problems. The ability to reduce propagation times through the use of HC-ARFs may provide more locations for prospective data centers in relation to originating data centers. Thus, HC-ARFs may allow virtual machines to tolerate greater physical distances, on the order of metro reaches. In yet another application, the reduced propagation losses achievable with HC-ARFs may allow for increased distances between optical amplifiers in submarine lines, thereby reducing the costs associated with these lines. Moreover, dry air, vacuum or other gas can have a vanishingly small nonlinear behavior nearly eliminating limitations such as FWM, Raman scattering, and Brillouin scattering that are present in conventional SC optical fibers.

For a variety of reasons, it may be useful to characterize the optical properties of deployed telecommunication cables. For example, accurate link budgeting for submarine cables requires detailed knowledge of the dispersion map (when propagation nonlinearities are present) and per-wavelength power out of each amplifier (power profile), which may vary from span to span along the link (gain evolution). In practice, complete dispersion and manufacturing data for deployed cables is often not available to third party terminal equipment suppliers or cable owners, and it is only possible to measure the power profile at the termination points of the link.

The present state of the art for link monitoring is summarized in K. Toge and F. Ito, "Recent research and development of optical fiber monitoring in communication systems", *Photonic Sensors*, vol. 3, no. 4, pp. 304-313, 2013.

Optical time domain reflectometers (OTDRs) are used to measure loss as a function of distance within each span, which is very useful for detecting fiber breaks. It is common for network elements such as optical amplifiers and wavelength selective switches (WSSs) to have OTDR functions to provide information about the status of a link.

The cumulative dispersion at the end of an optical link is reported by the WL3 coherent modems commercially available from Ciena Corporation headquartered in Hanover, Md., USA.

H. Onaka, K. Otsuka, M. Hideyuki and T. Chikama, "Measuring the Longitudinal Distribution of Four-Wave Mixing Efficiency in Dispersion-Shifted Fibers", *IEEE Photonics Technology Letters*, vol. 6, no. 12, p. 1454, December 1994 describes pump-probe techniques for measuring the zero dispersion wavelength as well as the nonlinear refractive index $n_2$ of an optical fiber (given the effective area of the fiber) by measuring the variation in FWM efficiency as a function of wavelength separation between continuous wave pump and probe wavelengths.

M. Ohashi, "Fiber Measurement Technique Based on OTDR", "Current Developments in Optical Fiber Technology", Dr. Sulaiman Wadi Harun (Ed.), ISBN: 978-953-51-

1148-1, reports using the Rayleigh scattering efficiency to extract the mode field diameter and dispersion.

A. Galtarossa and L. Palmieri, "Spatially Resolved PMD Measurements", *Journal of Lightwave Technology*, vol. 22, no. 4, p. 1103, 2004, reports using a polarization resolved OTDR (P-OTDR) which measures the polarization state of back-scattered light.

U.S. Pat. No. 9,960,843 to Shiner et al., incorporated herein by reference, describes a nonlinear spatially resolved interferometer (NL-SRI) which may be used to make pump-probe measurements on multi-span optical links for determining one or more of the wavelength-dependent power profile and gain evolution along the optical link, the wavelength-dependent dispersion map, and the location of regions of high polarization-dependent loss (PDL) and polarization-mode dispersion (PMD). Such measurements may be a useful diagnostic for maintenance and upgrade activities on deployed cables as well as for commissioning new cables. The pump-probe measurements described by Shiner et al. may be particular advantageous for submarine networks. In terrestrial networks, optical spectrum analyzers (OSAs) are often collocated with reconfigurable optical add-drop multiplexers (ROADMs), which are available at every node. In contrast, undersea systems generally do not have ROADMs available at every node. Thus, means other than OSAs may be needed to make optical power measurements in submarine systems.

The ability to perform OTDR measurements and pump-probe measurements depends on the nature of interactions between light transmitted on the optical fiber and the structure of the optical fiber. OTDR measurements rely on light being scattered or reflected back from points along the fiber. Pump-probe measurements, such as those describe by Shiner et al., rely on nonlinear interactions between pump pulses and probe pulses.

To date, HC-ARFs have generally been prototype and specialty fibers manufactured at volumes insufficient for metro applications. Accordingly, there has been a lack of motivation thus far to develop techniques for monitoring HC-ARFs. However, it is anticipated that the network cost reduction afforded by the improvements in reach and/or capacity that may be possible with HC-ARFs may drive further development in HC-ARF design, which may ultimately result in volume manufacturing of HC-ARFs that nearly achieve their fundamental loss capability. As HC-ARFs come into more widespread use, there will be a need to monitor changes in the transmission quality of the fibers and to make other measurements of the transmitted spectrum such as power as a function of wavelength, or polarization properties as a function of position. As previously noted, OTDR measurements rely on scattering, while pump-probe measurements rely on nonlinearity. Accordingly, these measurements may be readily available in conventional SC optical fibers, but may not be possible in HC optical fibers such as HC-ARFs. This is because the hollow core is predominantly filled with a non-solid medium, such as air, that does not cause appreciable scattering of light and also does not have an appreciable non-linear coefficient. Consequently, the development of a HC optical fiber that is capable of being monitored is of interest.

This document describes technology for a monitorable HC optical fiber apparatus comprising at least one monitorable HC optical fiber configured to transmit optical signals. Transmission of optical signals on a monitorable HC optical fiber may also be referred to as propagation. The monitorable HC optical fiber comprises one or more first segments and one or more second segments alternatingly connected with the first segments. Each first segment comprises HC-ARF and each second segment comprises one or more non-HC-ARF constituents. The non-HC-ARF constituents may include any combination of SC optical fiber constituents, HC-PBGF constituents, and various optical components such as lenses or other components used for mechanical splicing. Interactions between optical signals and the non-HC-ARF constituents may introduce a measurable amount of scattering or nonlinearity or both into the monitorable HC optical fiber which, in turn, may enable OTDR measurements or pump-probe measurements or both. Accordingly, the inclusion of the second segments (hereinafter referred to as "monitoring segments") may enable monitoring of one or more optical properties of the monitorable HC optical fiber. The optical properties may comprise one or more scatter, wavelength-dependent loss, wavelength-dependent power, wavelength-dependent dispersion, PDL, and PMD. Importantly, the presence of the non-HC-ARF constituents in the monitoring segments may permit measurements that would not be possible in a comparable HC optical fiber that did not include such monitoring segments.

Although the monitoring segments are described herein as comprising "non-HC-ARF constituents", it is contemplated that some designs of HC-ARF may provide sufficient surface scattering loss (SSL) to permit their use as constituents of the monitoring segments.

According to some examples, each monitoring segment may be connected to a respective HC-ARF segment using mechanical splicing. For example, the mechanical splicing could be achieved using a Single mode/Multimode Universal ULTRA Splice by FOSCO (Fiber Optics For Sale Co.) Part No.: US-126. Where the monitoring segment is connected to a further HC-ARF segment, the connection may again be achieved using mechanical splicing. In this manner, each monitoring segment may be alternatingly spliced with a HC-ARF segment. In some examples, fusion splicing could be used instead of mechanical splicing to connect HC-ARF segments to monitoring segments.

Figure 4:
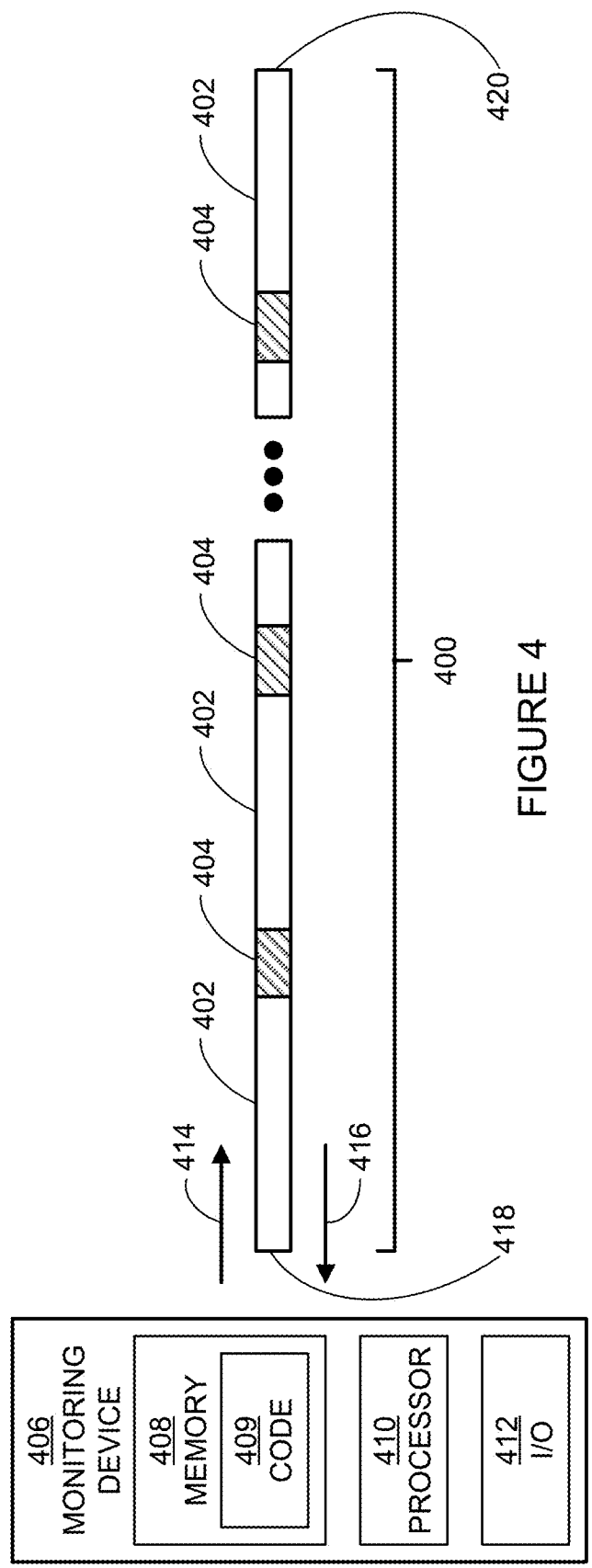
FIG. 4 illustrates a monitorable hollow core (HC) optical fiber apparatus in accordance with some examples of the technology disclosed herein.

FIG. 4 illustrates a monitorable HC optical fiber apparatus in accordance with some examples of the technology disclosed herein.

A monitorable HC optical fiber 400 comprises one or more first segments 402 and one or more second segments 404. Each first segment 402 comprises HC-ARF. Each second segment 404 comprises one or more non-HC-ARF constituents. Each first segment 402 is connected to at least one second segment 404. Similarly, each second segment 404 is connected to at least one first segment 402. In this manner, the one or more first segments 402 are alternatingly connected with the one or more second segments 404 (i.e., the monitoring segments 404). Although not explicitly illustrated, depending on the types of measurements to be made, the monitorable HC optical fiber 400 may comprise a single span or multiple spans.

Each monitoring segment 404 of the monitorable HC optical fiber 400 may enable monitoring of one or more optical properties of the monitorable HC optical fiber 400 using interactions between one or more optical signals and the one or more non-HC-ARF constituents of the monitoring segments 404. The monitoring of the optical properties may be achieved using one or more electronic devices, which may be located at one or both of a proximal end 418 and a distal end 420 of the monitorable HC optical fiber 400. According to the example illustrated in FIG. 4, a monitoring device 406 located at the proximal end 418 comprises a physical, non-transitory computer-readable medium or memory 408, which stores computer-readable instructions or code 409. The memory 408 may also store waveforms (not shown). The monitoring device 406 comprises a processor 410, which is operable to execute the code 409. The monitoring device 406 also comprises various input/output (I/O) components 412 which are coupled to the processor 410.

The components and functionality of the electronic device(s) used to monitor a span or link of the monitorable HC optical fiber 400 may differ depending on the properties to be monitored and the measurements to be made. For example, where the monitoring device 406 is operable to perform OTDR measurements for a single span, the I/O components 412 may comprise an optical source and a gated optical detector. Execution of the code 409 by the processor 410 may cause the optical source to transmit at least one first optical signal 414 from the proximal end 418 of the monitorable HC optical fiber 400 towards the distal end 420 of the monitorable HC optical fiber 400. Subsequently, the optical detector may detect at least one second optical signal 416 at the proximal end 418, where the second optical signal 416 is a function of interactions between the first optical signal 414 and the segments 402, 404 of the monitorable HC optical fiber 400. The code 409 may comprise a transduction algorithm which, upon execution by the processor 410, results in OTDR measurements based on the first optical signal 414 and the second optical signal 416.

In another example, where the monitoring device 406 is operable to perform pump-probe measurements for a link, as described by Shiner et al., the I/O components 412 may comprise a time-synchronized pair of pump-probe pilot optical sources and co-located coherent optical receivers.

According to some examples (not shown), optical detectors/receivers may be located in separate electronic devices from their respective optical sources.

According to some examples (not shown), a first electronic device at a proximal end of a monitorable HC optical fiber may transmit one or more first optical signals on the monitorable HC optical fiber, a second electronic device at a distal end of the monitorable HC optical fiber may detect one or more second optical signals responsive to the transmission of the first signals, and the second electronic device may return the one or more third optical signals (which are dependent on the second optical signals) back to the first electronic device via a separate optical fiber.

Other arrangements of one or more electronic devices for monitoring a monitorable HC optical fiber are contemplated. A general method for monitoring a monitorable HC optical fiber is described with respect to FIG. 16.

By inserting the monitoring segments into an otherwise HC span or link, it may be possible to achieve monitoring of a HC optical fiber that would otherwise be unmonitorable. However, it may be of interest to achieve a balance between the additional information that is provided by the monitoring segments and the transmission loss due to their presence. That is, each monitoring segment may be used to monitor optical properties at a particular location in the monitorable HC optical fiber, but each monitoring segment also represents a portion of the monitorable HC optical fiber that has a higher propagation loss than the adjacent HC-ARF segment(s). Furthermore, each boundary between a HC-ARF segment and an adjacent monitoring segment introduces a connection or coupling loss governed by the differences in the waveguide properties of the respective segments.

For a given application, there may be trade-off between the amount and type of information to be monitored and the loss that can be tolerated. For example, the boundary between a HC-ARF segment and a monitoring segment may generate a reflection of sufficient strength to provide some information about the light at the location of the boundary. If OTDR measurements are sufficient for monitoring the optical properties of interest, then the monitoring segments could be extremely short in length, for example, on the order of 10 µm. However, if pump-probe measurements are needed to monitor the optical properties of interest, then the monitoring segment could be much longer, for example, on the order of 5 km.

In order to realize the benefit of the HC-ARF segments, the quantity and respective properties of the monitoring segments may be selected such that propagation and coupling losses incurred by the monitorable HC optical fiber are lower than an expected propagation loss of a conventional SC optical fiber having a length identical to a length of the monitorable HC optical fiber. However, the quantity, distribution, and respective properties of the monitoring segments within a span or link may also be chosen based on the types of measurements to be made for a given application. That is, the monitorable HC optical fiber may be designed such that it includes a sufficient quantity and distribution of monitoring segments to enable the desired monitoring, but not so many monitoring segments (or segments of such excessive lengths) that the losses incurred by their presence negate or outweigh the propagation advantages provided by the HC-ARF segments.

Simulations may be performed to assess how much loss can be tolerated in a monitorable HC optical fiber due to the inclusion of the monitoring segments, while still achieving a desired improvement over a conventional SC optical fiber of the same length. FIGS. 5-10 illustrate simulations for a range of different monitorable HC optical fiber designs in accordance with some examples of the technology disclosed herein.

Figure 5:
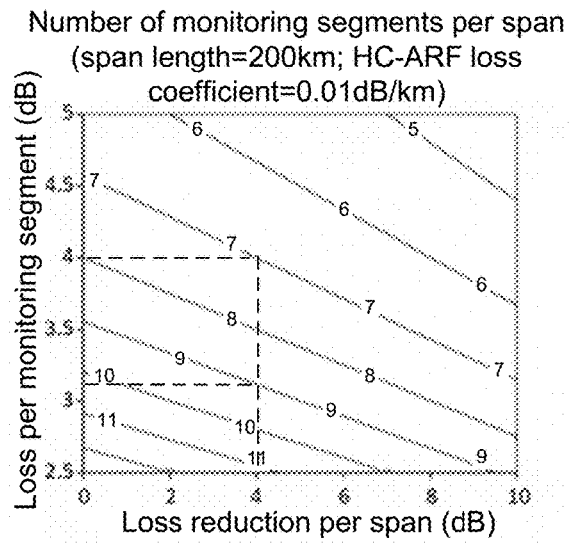
FIGS. 5-8 illustrate simulations for a range of different monitorable HC optical fiber designs in accordance with some examples of the technology disclosed herein, with each curve corresponding to a particular number of monitoring segments per span and representing the relationship between the loss per monitoring segment and the loss reduction per span of the monitorable HC optical fiber that is achievable with that particular design relative to a conventional solid core (SC) optical fiber.
Figure 6:
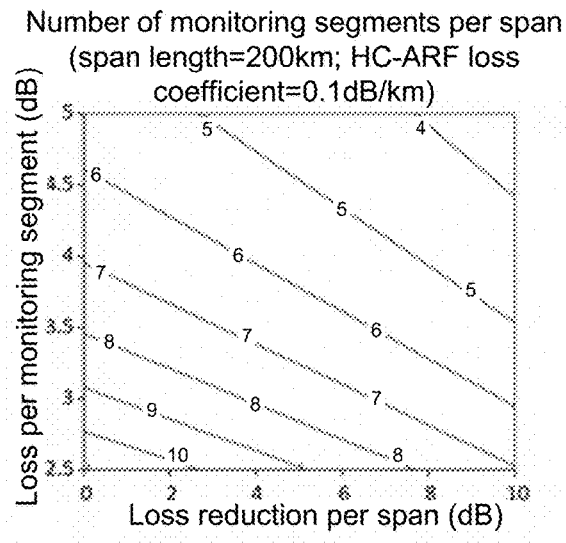
Figure 7:
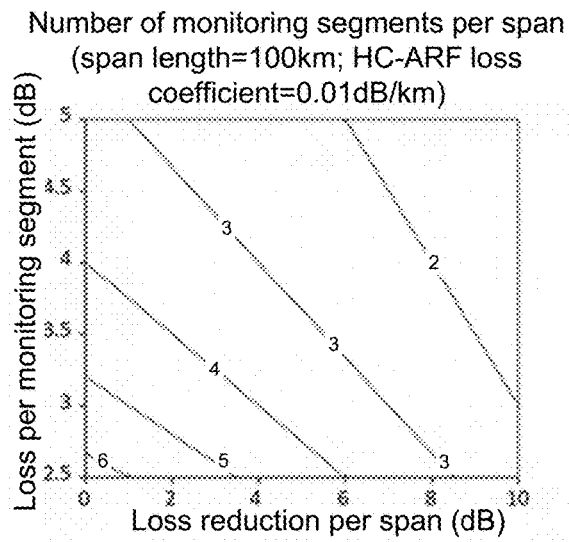
Figure 8:
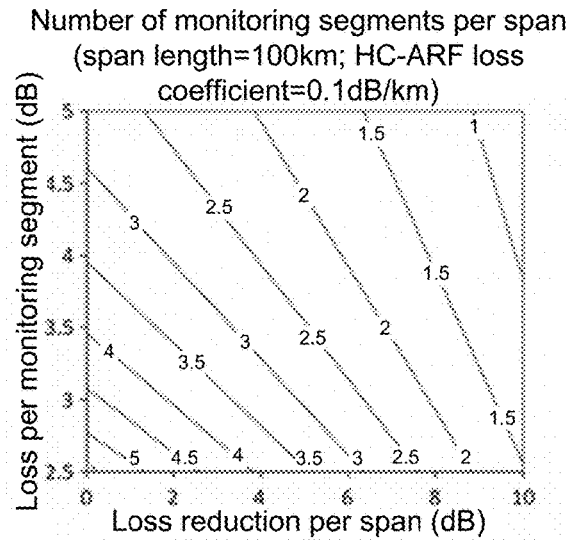

Referring first to the simulations in FIGS. 5-8, these simulations are based on an assumption that a conventional SC optical fiber has a loss coefficient of 0.17 dB/km (see, for example, Corning® TXF™ Optical Fiber). The simulations in FIGS. 5-6 are based on an additional assumption that the length of a span is 200 km, whereas the simulations in FIGS. 7-8 are based on the alternative assumption that the length of a span is 100 km. The simulations in FIGS. 5 and 7 are based on a further assumption that HC-ARF has a loss coefficient of 0.01 dB/km, whereas the simulations in FIGS. 6 and 8 are based on the alternative assumption that HC-ARF has a loss coefficient of 0.1 dB/km. These numbers are consistent with those recently reported by Jasion et al.

Each curve in FIGS. 5-8 corresponds to a particular number of monitoring segments within a span, and represents the relationship between the loss per monitoring segment (in dB) and the loss reduction per span of monitorable HC optical fiber (in dB) that is achievable with that particular monitorable HC optical fiber design relative to a conventional SC optical fiber. For example, in FIG. 5, the curve labeled "8" represents a monitorable HC optical fiber design having a span length of 200 km, having a HC-ARF span loss of 2 dB (calculated from 0.01 dB/km×200 km/span), and having 8 monitoring segments within the 200-km span length. The curves show that, for a given number of monitoring segments within a span, an increase in the loss per monitoring segment results in a decrease in the total loss reduction for the span, relative to a conventional SC optical fiber of the same span length. Eventually, the loss reduction becomes zero, since the combined loss due to the monitoring segments negates the advantage provided by the HC-ARF segments. For example, referring to FIG. 5, in the case of 8 monitoring segments, the loss reduction per span is 0 dB when the loss per monitoring segment is 4 dB. On the other hand, for a monitorable HC optical fiber design that comprises only 7 monitoring segments, the loss per monitoring segment can be increased up to approximately 4.5 dB before the loss reduction per span becomes 0 dB.

In general, a monitorable HC optical fiber may be designed such that the total loss incurred therein is less than the loss of a conventional SC optical fiber of the same length. According to some examples, the monitorable HC optical fiber may be designed to achieve a specific loss reduction relative to a conventional SC optical fiber of the same length. With the assumption that a conventional SC optical fiber has a loss coefficient of 0.17 dB/km, the total loss over a span length of 200 km would be calculated as 0.17 dB/km×200 km/span=34 dB. According to one example, the number of monitoring segments and the loss per monitoring segment may be selected such that the total loss of the monitorable HC optical fiber is 30 dB (i.e., a loss reduction of 4 dB). Referring again to the curves in FIG. 5, there are multiple designs that can achieve a loss reduction of 4 dB. For example, as shown by the dotted lines, where a monitorable HC optical fiber is designed to have 7 monitoring segments, and a loss per segment of 4 dB, the monitorable HC optical fiber will achieve a total loss reduction of 4 dB. This may be confirmed by calculating the sum of the loss due to the monitoring segments (4 dB/segment×7 segments=28 dB) and the HC-ARF span loss (2 dB). Alternatively, the same loss reduction of 4 dB could be achieved with a different monitorable HC optical fiber design having 9 monitoring segments, and a loss per segment of approximately 3.1 dB. One design may be preferable over another, depending on the application.

Figure 9:
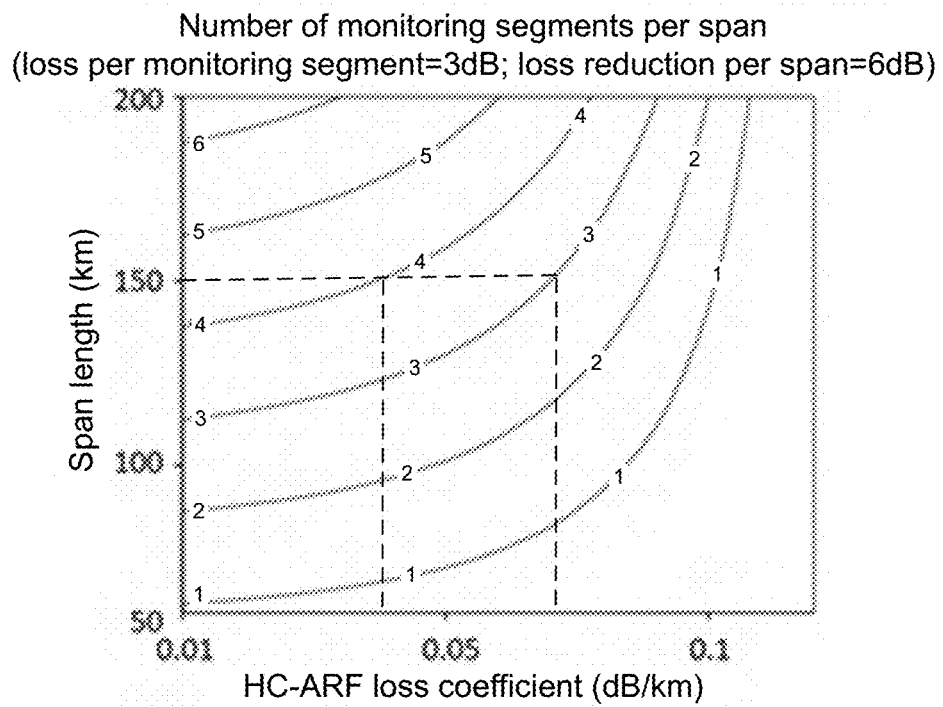
FIGS. 9-10 illustrate simulations for a range of different monitorable HC optical fiber designs in accordance with some examples of the technology disclosed herein, with each curve corresponding to a particular number of monitoring segments per span and representing the relationship between the span length and a loss coefficient of HC anti-resonant fiber (HC-ARF)
Figure 10:
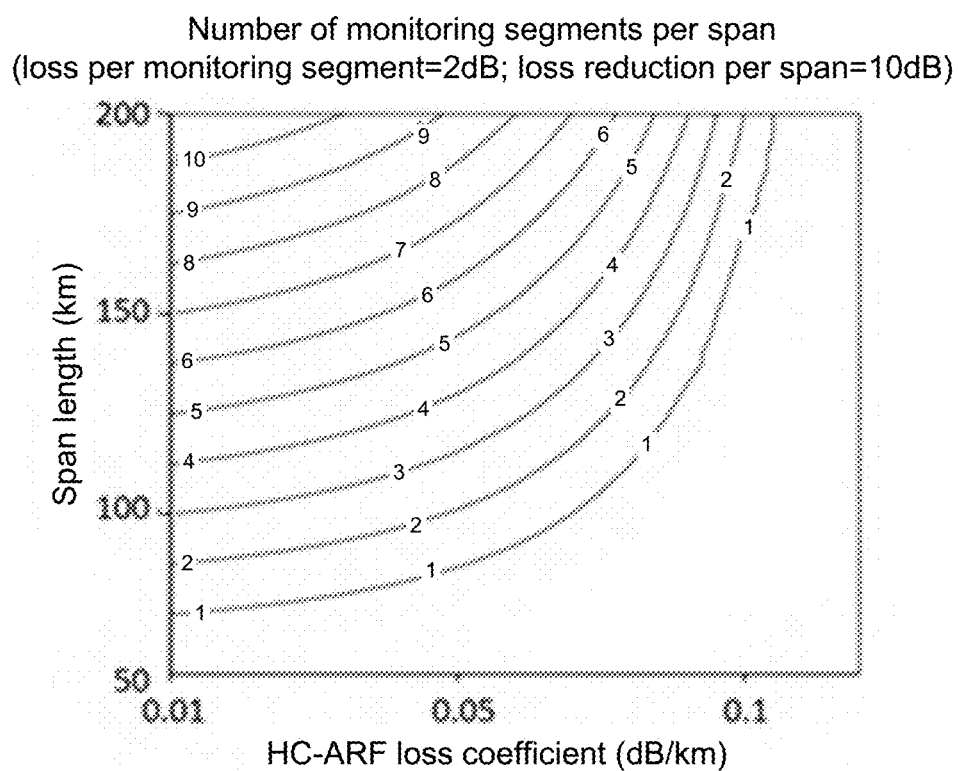

Referring now to the simulations in FIGS. 9 and 10, these simulations are again based on the assumption that a conventional SC optical fiber has a loss coefficient of 0.17 dB/km. The simulations in FIG. 9 are based on the additional assumptions that the loss per monitoring segment is 3 dB, and the loss reduction per span of monitorable HC optical fiber is 6 dB relative to a conventional SC optical fiber of the same span length. The simulations in FIG. 10 are based on the alternative assumptions that the loss per monitoring segment is 2 dB, and the loss reduction per span of monitorable HC optical fiber is 10 dB relative to a conventional SC optical fiber of the same span length.

Each curve in FIGS. 9 and 10 corresponds to a particular number of monitoring segments within a span, and represents the relationship between the span length (in km) and the loss coefficient of HC-ARF (in dB/km). For example, in FIG. 9, the curve labeled "3" represents a monitorable HC optical fiber design having three monitoring segments within a span length, with a loss per monitoring segment of 3 dB, and a loss reduction of 6 dB relative to a conventional SC optical fiber of the same span length. The curves show that, for a given number of monitoring segments within a span, a decrease in the HC-ARF loss coefficient results in a decrease in the span length needed to maintain the loss of reduction of 6 dB. For example, where the HC-ARF loss coefficient is 0.1 dB/km, a monitorable HC optical fiber design having three monitoring segments with a loss per segment of 3 dB would need to have a span length of more than 200 km in order to achieve a loss of reduction of 6 dB relative to a conventional SC optical fiber of the same length. Alternatively, where the HC-ARF loss coefficient is 0.01 dB/km, the same monitorable HC optical fiber design (with three monitoring segments, and a loss per segment of 3 dB) would only need to have a span length of approximately 120 km in order to achieve the same loss reduction of 6 dB. In other words, as improvements in the design of HC-ARF result in lower loss coefficients, the loss reduction of HC monitorable optical fibers relative to conventional SC optical fibers can be realized in progressively shorter span lengths. It follows that lower HC-ARF loss coefficients may permit the use of a higher number of monitoring segments within the same span length. For example, as shown by the dotted lines in FIG. 9, when the HC-ARF loss coefficient is approximately 0.07 dB/km, a monitorable HC optical fiber design that includes three monitoring segments (with 3 dB loss per segment) can achieve a span loss reduction of 6 dB when the span length is 150 km. However, when the HC-ARF loss coefficient is reduced to approximately 0.04 dB/km, the same span loss reduction can be achieved over the same span length of 150 km, but with a monitorable HC optical fiber design that includes four monitoring segments. It may be advantageous to increase the quantity of monitoring segments within a given span because each monitoring segment may provide additional information about the optical properties of the monitorable HC optical fiber at a different location within the span.

The loss incurred by a monitoring segment in a monitorable HC optical fiber may include connection or coupling losses incurred at the boundaries between the monitoring segment and the adjacent HC-ARF segments. According to some examples, the monitoring segments may have waveguide properties that are not matched to the adjacent HC-ARF segments. Coupling losses resulting from such mismatches may contribute significantly to the total losses incurred by the monitoring segments. Accordingly, it may be of interest to reduce or minimize these coupling losses.

Assuming uniform waveguide properties and a single transverse propagation mode in the functional part of a monitoring segment (i.e., the part of the monitoring segment that generates the optical change or signal for transduction), coupling loss has the same pathology at the input and output of the monitoring segment. For Gaussian modes, coupling loss between differing single mode waveguides may be approximated by Eq. 1.

$$\text{loss} = \frac{2 \cdot w_1 \cdot w_2}{w_1^2 + w_2^2}^2 \cdot \exp\left(-\left(\frac{2 \cdot w_1 \cdot w_2}{w_1^2 + w_2^2}\right)^2 \cdot \left(\frac{s^2}{w_1 \cdot w_2} + \frac{\theta^2}{\theta_{d1} \cdot \theta_{d2}}\right)\right) \quad [1]$$

where $w_2$ denotes a first waveguide mode field radius (MFR), where $w_1$ denotes a second waveguide MFR, where x denotes the axial offset between the first and second waveguides, where $(\theta_{d1}, \theta_{d2})$ denotes divergence angles of the waveguides, and where $\theta$ denotes the angular misalignment between waveguides (ideally zero). Given standard splicing practice, the largest contribution to coupling loss is the MFR mismatch, such that the coupling loss may be further approximated by Eq. 2.

$$\text{loss} = \left(\frac{2 \cdot w_1 \cdot w_2}{w_1^2 + w_2^2}\right)^2 \quad [2]$$

The MFR of conventional SC optical fiber is on the order of 4 μm to 7 μm (see, for example, Corning® Vascade® EX3000 Fiber), whereas the MFR of HC-ARF has been reported as approaching 15 μm (see, for example, Hayes et al. "Antiresonant Hollow Core Fiber with Octave Spanning Bandwidth for Short Haul Data Communications", *Journal* of *Lightwave Technology*, 1-5, DOI: 10.5258/SOTON/ 397853, 2016; Nawazuddin et al. "Lotus Shaped Negative Curvature Hollow Core Fiber with 10.5 dB/km at 1550 nm Wavelength", *Journal of Lightwave Technology*, Vol. 36, Issue 5, 2018; and Wheeler et al. "Low Loss Kagome Hollow Core Fibers Operating from the Near- to the Mid-IR", *Optics Letters*, Vol. 42, Issue 13, 2017). Thus, raw coupling losses in the vicinity of 2 dB to 6 dB might be expected between a segment of conventional SC optical fiber and a segment of HC-ARF. These losses may be reduced through the use of multiple fiber types (also referred to as transition fibers) to perform a spot size conversion. That is, by selecting a series of transition fibers in which the MFRs of the coupled waveguides change incrementally for each successive application of Eq. 2, the coupling loss between the MFR of a segment of conventional SC optical fiber and the MFR of a segment of HC-ARF may be significantly reduced. Where a monitoring segment includes a series of transition fibers, each of the transition fibers may be referred to as a transition subsegment of the monitoring segment. In such cases, the "effective MFR of the monitoring segment" may be understood as referring to the non-transition subsegments of the monitoring segment. In other examples, each of the transition fibers may be referred as a transition subsegment of the HC-ARF segment. In such cases, the "effective MFR of the HC-ARF segment" may be understood as referring to the non-transition subsegments of the HC-ARF segment. In other examples, a series of transition fibers may instead by referred to as a transition segment that is separate from the both monitoring segment and the HC-ARF segment. Transition fibers may be fabricated using standard fiber manufacturing processes, and may be connected, for example, using fusion splicing. According to some examples, fusion splicing may also be used to connect a transition segment to a monitoring segment, or to connect a transition segment to a HC-ARF segment, or both. According to some examples, mechanical splicing may be used to connect a transition segment to a monitoring segment, or to connect a transition segment to a HC-ARF segment, or both.

Figure 11:
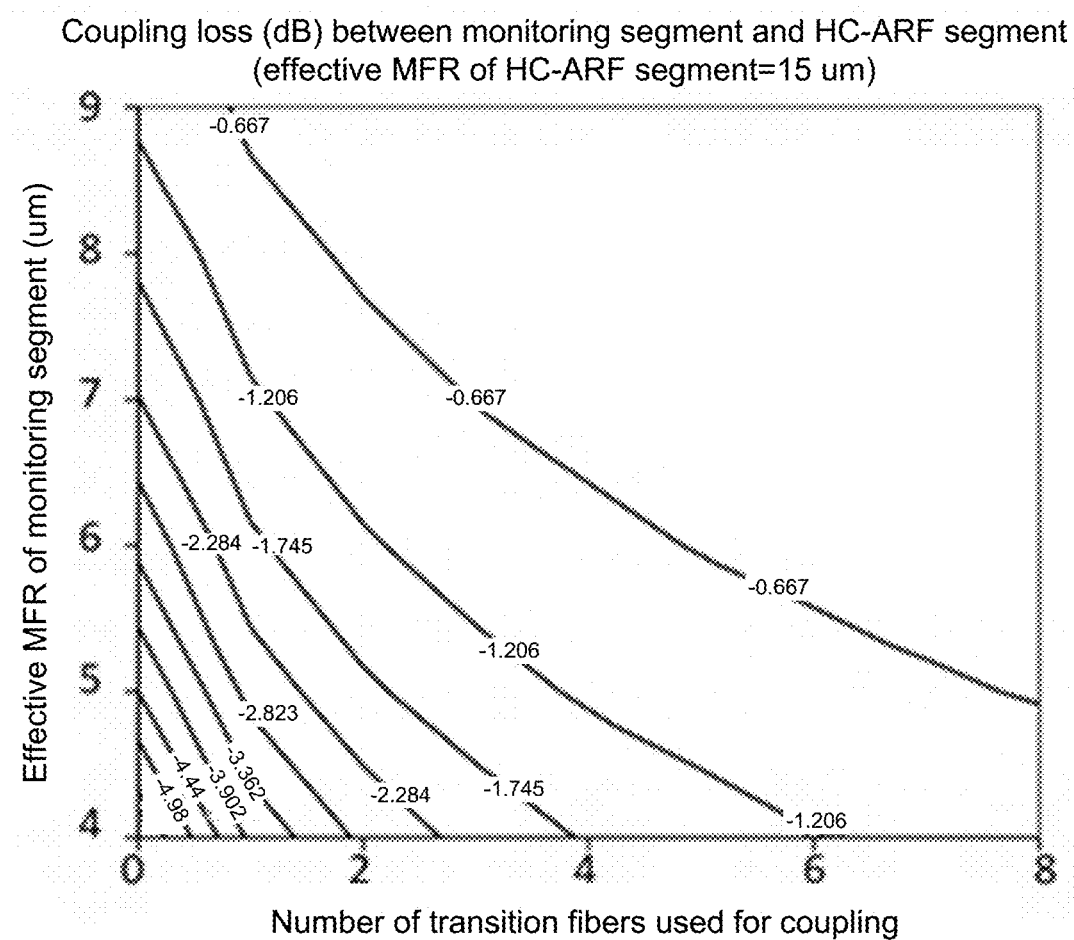
FIG. 11 illustrates simulations for a range of different monitoring segment designs to be used in a monitorable HC optical fiber in accordance with some examples of the technology disclosed herein, with each curve corresponding to a particular coupling loss between a monitoring segment and a HC-ARF segment and representing the relationship between the effective mode field radius (MFR) of the monitoring segment and the number of transition fibers used for the coupling.

FIG. 11 illustrates simulations for a range of different monitoring segment designs to be used in a monitorable HC optical fiber in accordance with some examples of the technology disclosed herein.

Each curve corresponds to a particular coupling loss (in dB) between a monitoring segment and a HC-ARF segment and represents the relationship between the effective MFR of the monitoring segment (in μm) and the number of transition fibers used for the coupling. The simulations are based on an assumption that a HC-ARF segment has an effective MFR of 15 μm.

The curves show that, for a given effective MFR of the monitoring segment, the coupling loss decreases as the number of transition fibers increases. For example, for a monitoring segment with an effective MFR of 5.4 μm, it may be shown that the use of two transition fibers may reduce the coupling loss from 4 dB down to 1.5 dB, while the use of nine transition fibers may further reduce the coupling loss down to only 0.5 dB.

According to some examples, the length of each transition subsegment may be selected such that, at its installed bend radius, multipath interference (MPI) is maintained below a certain threshold. For example, MPI may be maintained below approximately −48 dB.

As described above, the losses incurred by the monitoring segments in a monitorable HC optical fiber may include coupling losses and losses due to physical properties of the monitoring segments. These physical properties may include the respective lengths of the monitoring segments, and the respective compositions of the monitoring segments. The physical properties of the monitoring segments and their distribution within a given span may be selected based on the types of measurements to be made, while still balancing the information to be gleaned from the monitoring segments against the losses incurred as a result of their presence.

OTDR measurements use the backscatter from a light pulse as a function of time to determine loss as a function of distance along a fiber. A typical OTDR may have a reach of approximately 100 km and a distance resolution of approximately 100 m for a pulse width of approximately 500 ns. In the third telecommunication window, approximately half of the loss is due to Rayleigh scattering. Of the scattered light, a fraction of approximately $$\frac{NA^2}{4}$$

is captured by the fiber to return for detection, where NA denotes the numerical aperture of the fiber. The NA of a conventional SC single mode optical fiber is usually on the order of 0.05 to 0.15. The backscatter fraction, BSF, attributed to a length of fiber equal to an OTDR pulse length R in km may be determined using Eq. 3.

$$BSF = \frac{NA^2}{4} \cdot \left(1 - 10^{\frac{-\alpha \cdot R}{20}}\right) \quad [3]$$

where α denotes the loss coefficient in dB/km. Thus, for NA=0.15, α=0.17 dB/km, and R=0.1 km, BSF is approximately $10^{-5}$. It follows that a well coupled single point of reflection with a reflection coefficient of $10^{-5}$ or greater may provide sufficient backscattered light to be an effective source for an OTDR measurement.

HC-PBGF may also serve as an effective scattering source for OTDR measurements.

The scattering from HC-PBGF may be ten to one hundred times that of a conventional SC optical fiber. Accordingly, a sufficient OTDR scattering source of HC-PBGF could be 1 m to 10 m in length.

An upper bound on the practical BSF of a monitoring segment may be estimated from the MPI caused by two monitoring segments per span. Assuming each monitoring segment has the same loss L and the same BSF, the noise to signal ratio (NSR) in dB due to MPI of the $n^{th}$ monitoring segment and the $n+1^{th}$ monitoring segment is denoted by Eq. 4.

$$NSR_{MPI}^{n,n+1} = 10 \cdot \log(2 \cdot L \cdot BSF) \quad [4]$$

It follows that the NSR due to MPI of N monitoring sections in a span may be approximated by Eq. 5.

$$NSR_{MPI} \sim 10 \cdot \log(2 \cdot L \cdot BSF \cdot (N-1)) \quad [5]$$

The MPI between spans is inhibited by isolators in the optical amplifiers, but the (linear) $NSR_{MPI}$ of each span is summed over the link. According to some examples, in order for the accumulated link $NSR_{MPI}$ to be considered inconsequential, the $NSR_{MPI}$ per span may be kept below approximately −40 dB to approximately −35 dB, depending on the number of spans. For example, given a link consisting of 60 spans, each span having $NSR_{MPI}$=−40 dB, the total accumulated link $NSR_{MPI}$ would be approximately −22 dB. This is only 10% of the noise tolerance of a modem having a required SNR (RSNR) of 10 dB. Using this criterion of setting a maximum $\text{NSR}_{MPI}$ per span, for a monitoring segment loss of L=0.5 (i.e., 3 dB) and N=4 monitoring segments per span, it may be determined from Eq. 5 that the BSF of a monitoring segment should not exceed $10^{-4}$. On the other hand, as previously noted, it may be determined from Eq. 3 that the BSF of the monitoring segment should be greater than approximately $10^{-5}$ in order to enable OTDR measurements. Thus, according to some examples, a monitoring segment may be designed to have a BSF that is less than approximately $10^{-4}$ but greater than approximately $10^{-5}$. It should be noted, however, that this is merely one example of the possible range of BSF values for a monitoring segment. Other designs may allow for more MPI noise while still providing a monitorable HC-ARF with a net reach advantage over a conventional SC optical fiber.

Figure 12:
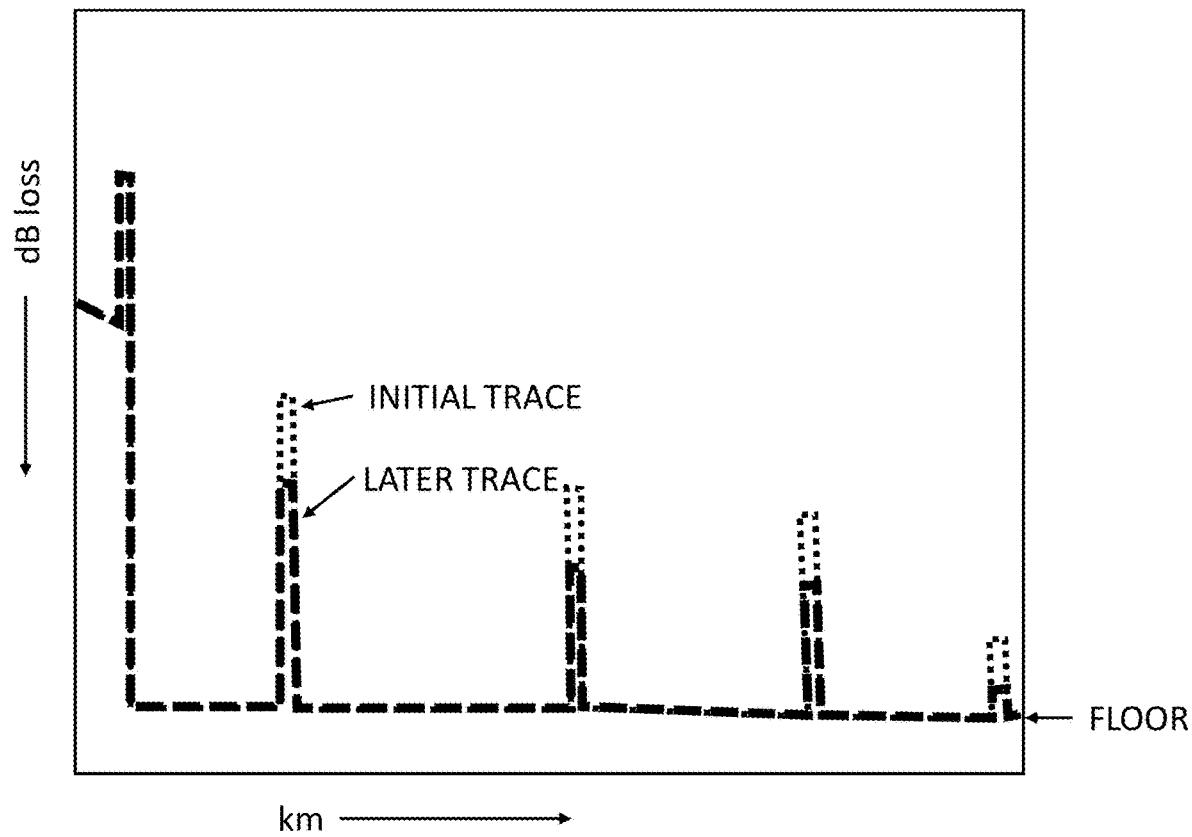
FIG. 12 illustrates optical time domain reflectometer (OTDR) trace simulations for a span of monitorable HC optical fiber in accordance with some examples of the technology disclosed herein.
Figure 12:
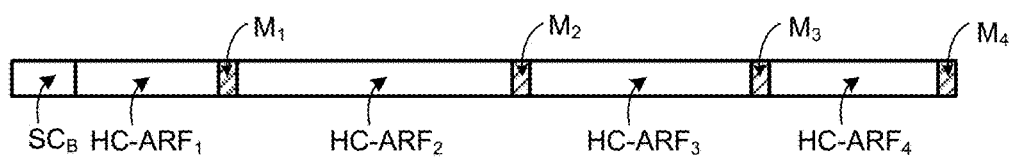

FIG. 12 illustrates OTDR trace simulations for a span of monitorable HC optical fiber in accordance with some examples of the technology disclosed herein. The plotted curves represent two different OTDR traces showing the relationship between transmission loss (in dB) and distance (in km) from the proximal end of the monitorable HC optical fiber, from which the OTDR pulses are transmitted. The span of monitorable HC optical fiber, which is shown below the OTDR trace simulations, comprises four HC-ARF segments, denoted $\text{HC-ARF}_1$, $\text{HC-ARF}_2$, $\text{HC-ARF}_3$, and $\text{HC-ARF}_4$, respectively, which are alternately connected with four monitoring segments, denoted $M_1$, $M_2$, $M_3$, and $M_4$, respectively. $\text{HC-ARF}_1$ denotes the HC-ARF segment that is located closest to the proximal end of the monitorable HC optical fiber. $SC_B$ denotes a segment of SC optical fiber of length greater than the pulse length, where $SC_B$ acts as a bias fiber. It is common practice to install such a bias fiber when making OTDR measurements in order to distinguish the fiber being tested. "Floor" denotes the noise of the measurement system, since there is no backscatter from the HC-ARF segments.

The dotted line represents an initial OTDR trace taken, for example, at the time of installation of the span of monitorable HC optical fiber. The bold dashed line represents a subsequent OTDR trace taken some time after the initial OTDR trace and, in this example, after the span of monitorable HC optical fiber has experienced an increase in transmission loss somewhere in the segment $\text{HC-ARF}_1$. The loss value increase in the segment $\text{HC-ARF}_1$ is measurable from the signal change between the initial trace and the later trace at the monitoring segment $M_1$. In general, the loss difference measured at a given monitoring segment is the sum of loss differences from all preceding HC-ARF segments (i.e., all HC-ARF segments to the left of the given monitoring segment). Thus, in order to monitor changes in the loss within a span of monitorable HC optical fiber, a trace taken at a first time (e.g., the time of installation) may be compared to a trace taken at a second, later time (e.g., a time after installation). Alternatively, each monitoring segment loss and BSF may be calibrated a priori and a single OTDR signature may be interpreted based on that calibration.

From the foregoing, the use of monitoring segments may enable changes in the transmission of light through the HC-ARF segments to be detected with a resolution equal to the distance between monitoring segments.

According to some examples, it may be advantageous for OTDR measurements if monitoring segments are distributed at approximately equal intervals throughout the span of monitorable HC optical fiber, such that the monitoring segments are able to provide uniformly distributed information about transmission loss over the length of the span. According to some examples, monitoring segments may be omitted from one or both of the proximal end and the distal end of the monitorable HC optical fiber, as their presence in these locations may incur transmission losses without providing additional information. For example, for OTDR measurements, a monitoring segment may be omitted from the proximal end of the monitorable HC optical fiber, since it would provide no additional information at this location.

As described by Shiner et al., channel power as a function of wavelength may be measured as nonlinear crosstalk between a pump pulse at a channel wavelength and a probe pulse. Nonlinear phase angles of approximately 1 degree are measurable by comparing consecutive probe and pilot pulses of a probe wavelength, where the probe pulse collides with the pump and the pilot pulse does not. A nonlinear phase of 2±0.2 degrees with a resolution of 12 km may be measured with a pump-pilot/probe scheme on G.652 fiber, where the pump power is 0 dBm. Similarly, a nonlinear phase of 1±0.2 degrees may be measured at the same pump power from a 5 km G.652 monitoring segment. Since pump power is proportional to nonlinear phase, the measured nonlinear phase may provide a measure of pump channel power. For a power measurement, it may be advantageous to place a monitoring segment that is designed for pump-probe power measurements at the proximal end of the span, such that the highest pump channel power is observed. For a monitorable HC optical fiber equipped in this manner, the pulse-probe monitoring segment adds nonlinear phase in proportion to the length of the segment. A monitorable HC optical fiber that begins with a SC pulse-probe monitoring segment may support a higher launch power than a conventional SC optical fiber of the same length, where the increase in launch power, $P_{inc}$, in dB is proportional to a ratio of the nonlinear length of the conventional SC optical fiber to the nonlinear length of the SC monitoring segment, as provided by Eq. 6.

$$P_{inc} = 10 \cdot \log\left(\frac{1-e^{-\alpha_f \cdot L_f}}{1-e^{-\alpha_m \cdot L_m}} \cdot \frac{\alpha_m}{\alpha_f}\right) \quad [6]$$

where $\alpha_f$ denotes the attenuation coefficient of the conventional SC optical fiber, where $\alpha_m$ denotes the attenuation coefficient of the SC monitoring segment, where $L_f$ denotes the length of the conventional SC optical fiber, and where $L_m$ denotes the length of the SC monitoring segment.

Figure 13:
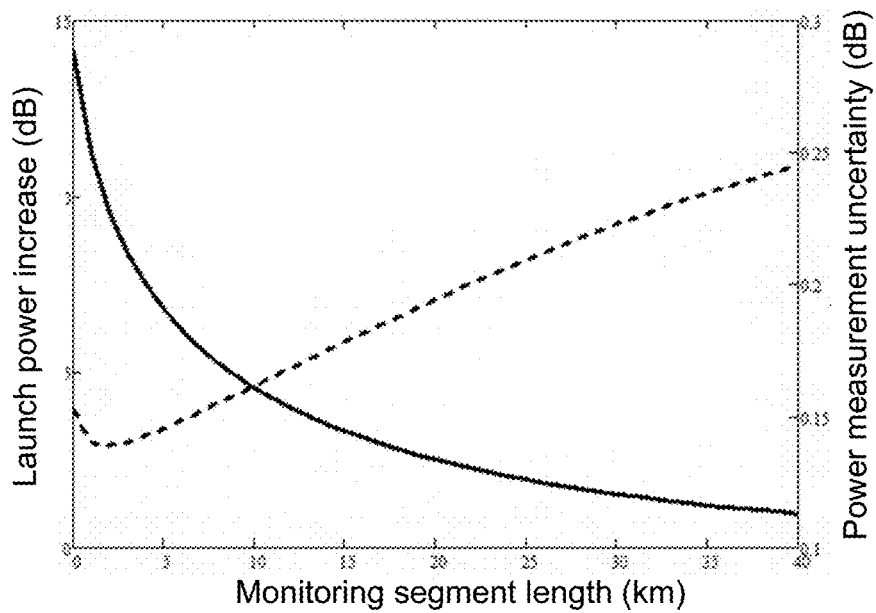
FIGS. 13-14 illustrate power simulations for a monitorable HC optical fiber in accordance with some examples of the technology disclosed herein.
Figure 14:
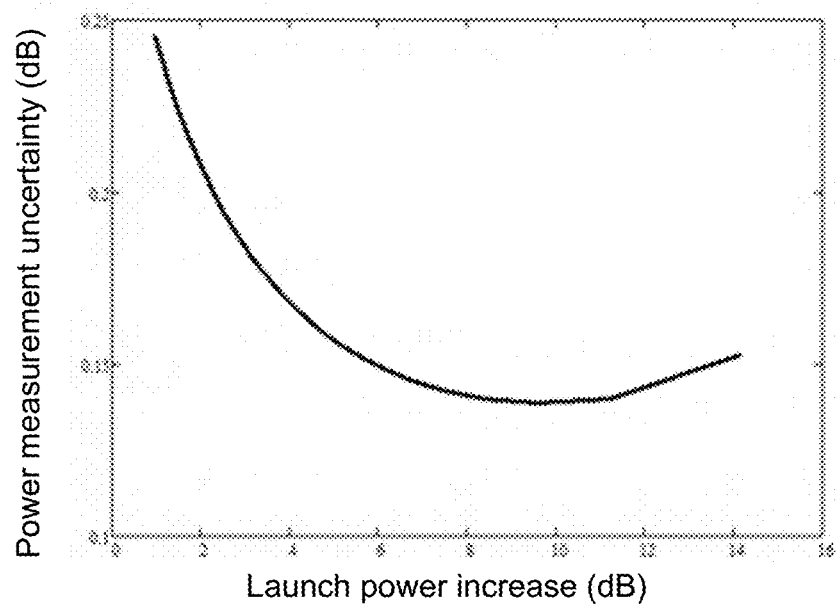

FIGS. 13-14 illustrate power simulations for a monitorable HC optical fiber in accordance with some examples of the technology disclosed herein. The monitorable HC optical fiber is 100 km in length and has a monitoring segment located at its proximal end which is designed for pump-probe power measurements and comprises G.652 fiber.

Referring first to FIG. 13, the solid curve represents the relationship between launch power increase (in dB) and monitoring segment length (in km), where the launch power increase is shown on the left vertical axis. The dashed curve represents the relationship between power measurement uncertainty (in dB; 1 standard deviation) and monitoring segment length (in km), where the power measurement uncertainty is shown on the right vertical axis.

The minimum power measurement uncertainty occurs when the monitoring segment has a length on the order of approximately 5 km. For this length of monitoring segment, the launch power increase is on the order of approximately 8 dB, meaning that this particular design for the monitorable HC optical fiber is expected to provide a launch power that is 8 dB higher than the launch power of a SC optical fiber of type G.652 having a length equal to that of the monitorable HC optical fiber (i.e., 100 km).

The curve in FIG. 14 represents the relationship between power measurement uncertainty (in dB) and launch power increase (in dB).

A property of HC-ARF is that it cannot be used as an optical amplification medium. Consequently, optical amplification may be achieved using SC optical fiber. The difference in MFR between a segment of SC optical fiber used for amplification and a HC-ARF segment results in a coupling loss. This coupling loss might be reduced or minimized by appropriate design of the MFR of the SC segment. In the case of pump-probe type monitoring, the first segment of a span, connected to an optical amplifier of standard design, such as an EDFA, may be a segment of SC optical fiber. This proximal monitoring segment may in turn be connected to a HC-ARF segment, optionally via one or more transition subsegments. When the SC monitoring segment is chosen to have the same MFR as the that of the of the optical amplifier, the coupling loss is minimized. This construction may circumvent one of the two transitions that would be required for a monitoring segment placed between two HC-ARF segments. A segment of SC optical fiber may alternatively or additionally be used to form the last segment of the span (i.e., a distal monitoring segment), prior to the next optical amplifier in the link. For example, a monitorable HC optical fiber may comprise a proximal monitoring segment located at one end and a distal monitoring segment located at the other end, where an output of one optical amplifier is connected to the proximal monitoring segment, and an input of another optical amplifier is connected to the distal monitoring segment.

Figure 15:
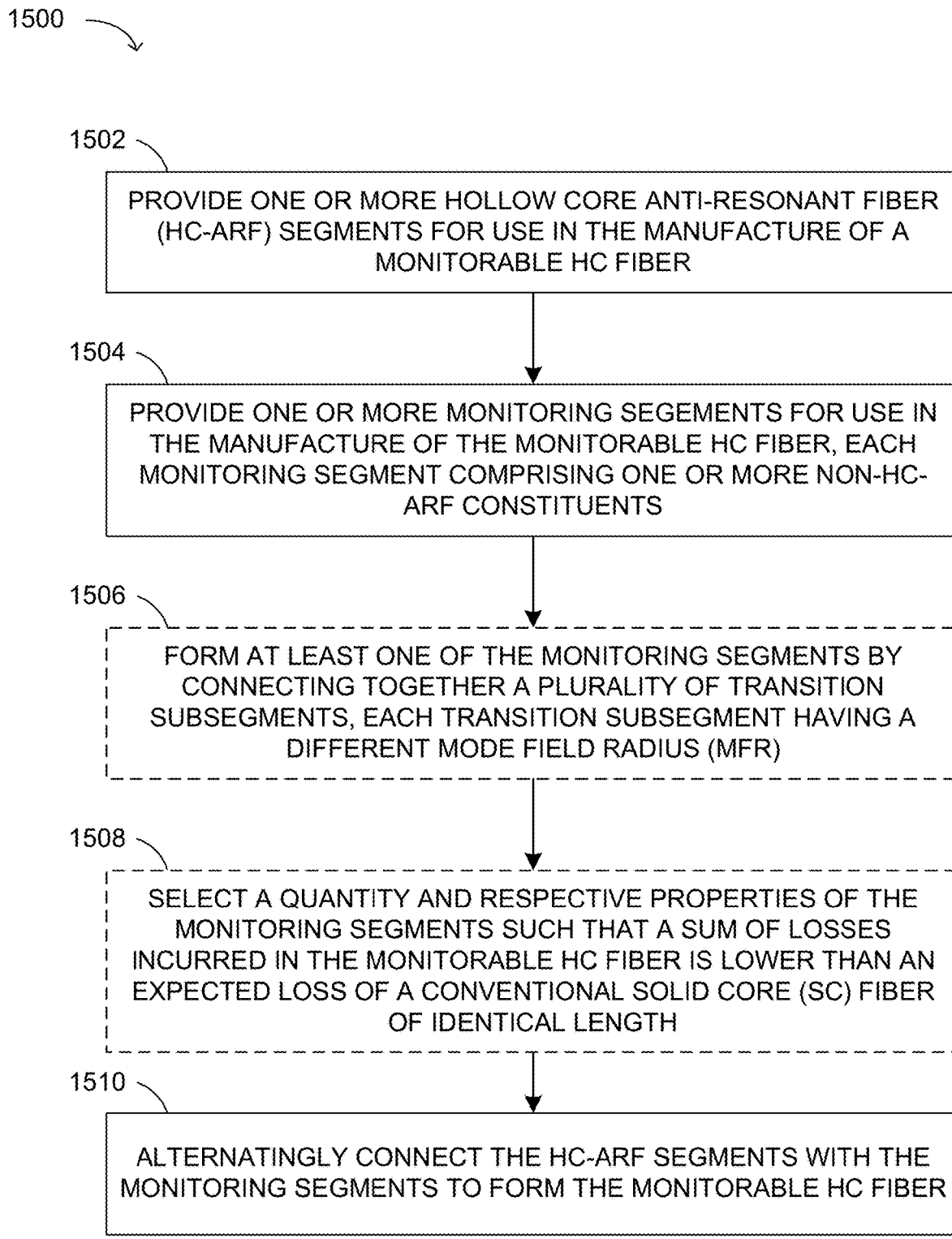
FIG. 15 illustrates an example method for manufacturing a monitorable HC optical fiber in accordance with some examples of the technology disclosed herein.

FIG. 15 illustrates an example method 1500 for manufacturing a monitorable HC optical fiber in accordance with some examples of the technology disclosed herein.

At 1502, one or more HC-ARF segments, such as the first segments 402 described with respect to FIG. 4, are provided for use in the manufacture of the monitorable HC optical fiber.

At 1504, one or more monitoring segments, such as the second segments 404 described with respect to FIG. 4, are provided for use in the manufacture of the monitorable HC optical fiber. Each monitoring segment comprises one or more non-HC-ARF constituents.

As shown at 1506, the method 1500 may optionally comprise forming at least one of the monitoring segments by connecting together a plurality of transition subsegments, each transition subsegment having a different MFR.

As shown at 1508, the method 1500 may optionally comprise selecting a quantity and respective properties of the monitoring segments such that a sum of losses incurred in the monitorable HC optical fiber is lower than an expected loss of a conventional SC optical fiber having a length identical to a length of the monitorable HC optical fiber.

At 1510, the one or more HC-ARF segments are alternatingly connected with the one or more monitoring segments to form the monitorable HC optical fiber. As previously described, the alternating connections between the HC-ARF segments and the monitoring segments may be achieved using splicing. For example, the splicing may comprise mechanical splicing, fusion splicing or a combination thereof.

One or more optical properties of the monitorable HC optical fiber may be monitorable using interactions between one or more optical signals transmitted on the monitorable HC optical fiber and the non-HC-ARF constituents of the monitoring segments.

Figure 16:
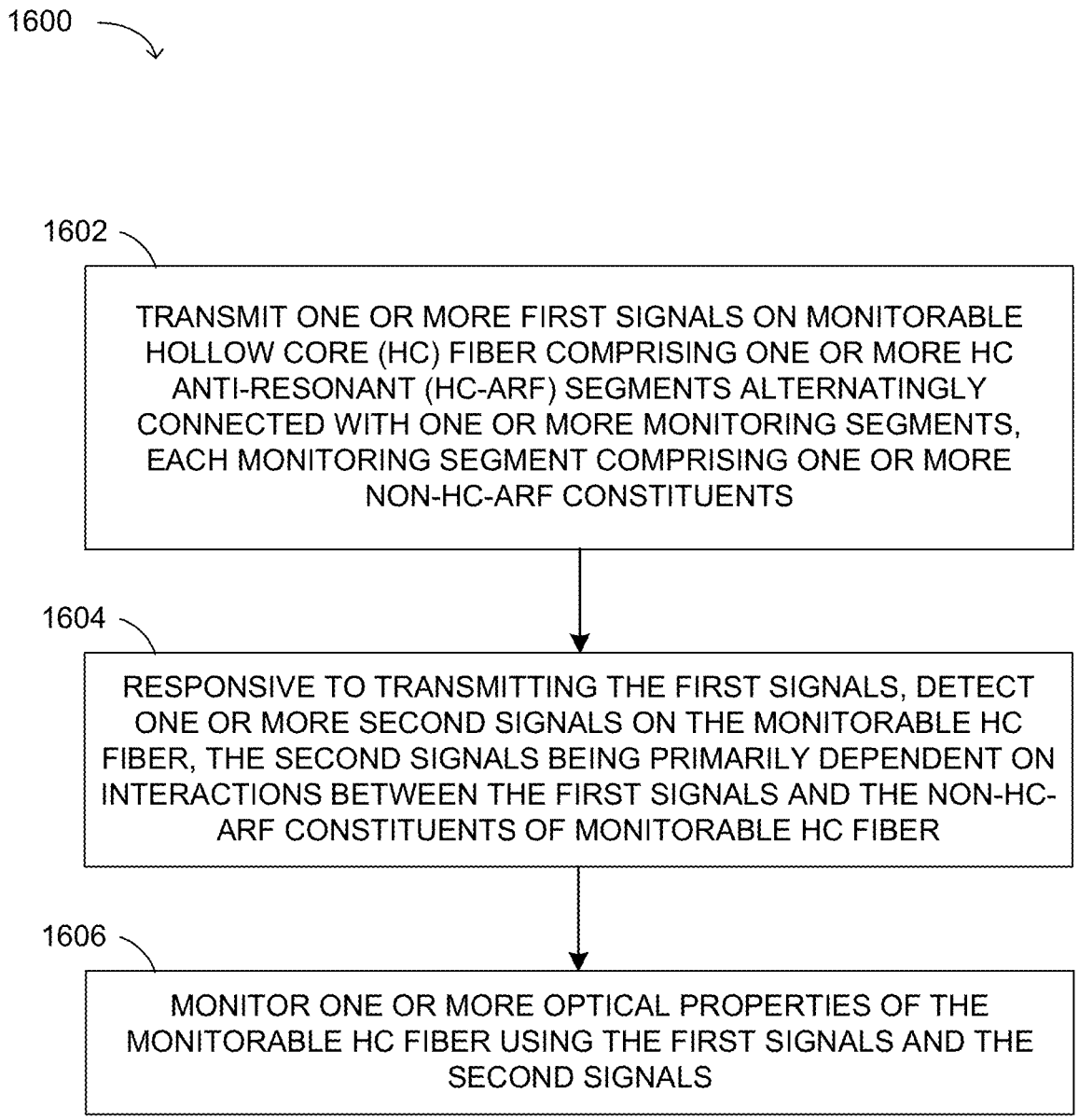
FIG. 16 illustrates an example method for monitoring a monitorable HC optical fiber in accordance with some examples of the technology disclosed herein.

FIG. 16 illustrates an example method 1600 for monitoring a monitorable HC optical fiber in accordance with some examples of the technology disclosed herein. The method 1600 may be performed using one or more electronic devices, which may be located at one or both of a proximal end and a distal end of the monitorable optical fiber. For example, the method 1600 may be performed by the monitoring device 406 as described with respect to FIG. 4, or by some other device or combination of devices that are operable to perform OTDR measurements or pump-probe measurements or both.

At 1602, one or more first optical signals are transmitted on a monitorable optical fiber. For example, as described with respect to FIG. 4, the monitoring device 406 generates and transmits the at least one first optical signal 414 from the proximal end 418 of the monitorable HC optical fiber 400 toward the distal end 420 of the monitorable HC optical fiber 400. In general, the one or more first optical signals may be generated at one or more electronic devices and may be transmitted in either direction on the monitorable optical fiber.

The monitorable optical fiber on which the one or more first optical signals are transmitted at 1602 comprises one or more HC-ARF segments which are alternatingly connected with the one or more monitoring segments, where each monitoring segment comprises one or more non-HC-ARF constituents. The properties of the monitorable HC optical fiber may be selected, as described herein, to provide desired monitoring capabilities while achieving transmission advantages relative to conventional SC optical fiber.

Responsive to transmitting the one or more first optical signals, one or more second optical signals are detected on the monitorable HC optical fiber at 1604. For example, as described with respect to FIG. 4, the monitoring device 406 detects the at least one second optical signal 416 at the proximal end 418 of the monitorable HC optical fiber 400.

The one or more second optical signals are a function of interactions between the one or more first optical signals and both the HC-ARF segments and monitoring segments through which the one or more first optical signals have been transmitted. Due to the HC structure of the HC-ARF segments, the one or more second optical signals detected at 1604 may be primarily dependent on the interactions with the non-HC-ARF constituents within the monitoring segments. That is, a majority of each second optical signal detected at 1604 originates from interactions between the one or more first optical signals transmitted at 1602 and non-HC-ARF constituents of the monitorable HC optical fiber. But for the presence of the non-HC-ARF constituents, monitoring of the otherwise HC optical fiber would likely be impossible.

As previously described, a quantity and respective properties of the monitoring segments may have been selected such that a sum of losses incurred in the monitorable HC optical fiber is lower than an expected propagation loss of a conventional SC optical fiber having a length identical to a length of the monitorable HC optical fiber.

At 1606, one or more optical properties of the optical fiber are monitored by performing calculations or measurements using the one or more first optical signals that were transmitted at 1602 and the one or more second optical signals that were detected at 1604. The measurements may be performed by one or more electronic devices and may comprise OTDR measurements or pump-probe measurements or both. The one or more optical properties may comprise one or more of scatter, loss, wavelength-dependent power, wavelength-dependent dispersion, PDL, and PMD.

The method 1600 may be performed at two or more different times. For example, the method 1600 may be performed at or shortly after installation of the monitorable HC optical fiber, and may subsequently be repeated at a later time. One or more optical properties measured in the initial performance of the method 1600 may be compared to those same optical properties as measured in the later performance of the method 1600. Any differences between the optical properties may be interpreted as changes in monitorable HC optical fiber.

In general, a monitorable HC optical fiber may comprise monitoring segments which have a single, uniform length and composition, or a variety of different lengths and/or compositions. The distribution of the monitoring segments and the spacing between the monitoring segments may be uniform or non-uniform within the monitorable HC optical fiber.

Figure 17:
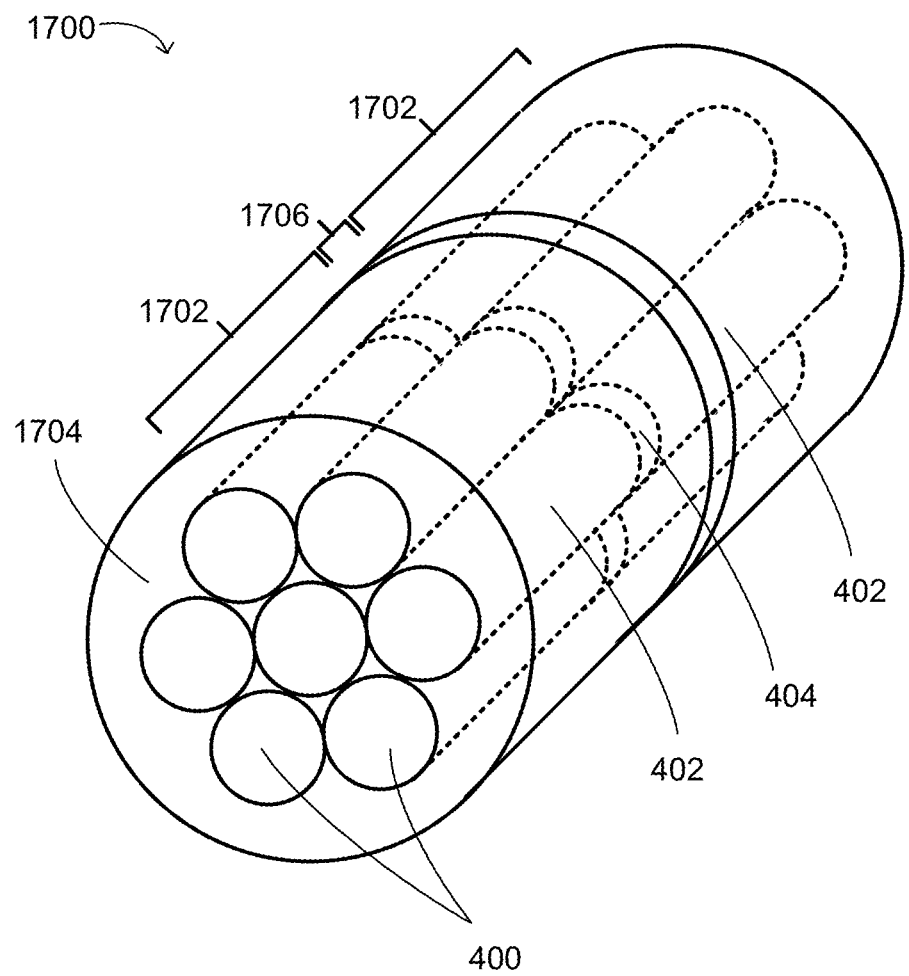
FIG. 17 illustrates an example monitorable HC optical cable.

Throughout this document, references have been made to "optical fiber", including references to a monitorable HC optical fiber, and to HC-ARF segments thereof and monitoring segments thereof. However, it should be understood that the technology presented herein may also be applicable to optical cables, where an optical cable includes a protective conduit that surrounds or houses one or more optical fibers in parallel. For example, a span of an optical link may comprise a plurality of sections of cable. For example, as illustrated in FIG. 17, a section of HC-ARF cable 1702 may comprise one or more HC-ARF segments 402 arranged in parallel and surrounded by a protective conduit 1704, while a section of monitoring cable 1706 may comprise one or more monitoring segments 404 arranged in parallel and surrounded by a protective conduit 1704, where each monitoring segment comprises one or more non-HC-ARF constituents. At the time of installation, the sections of cable may be connected or spliced together. That is, a monitorable HC optical cable 1700 may be manufactured by alternatingly connecting one or more sections of HC-ARF cable 1702 with one or more sections of monitoring cable 1706, where the resulting monitorable HC optical cable 1700 comprises at least one monitorable HC optical fiber 400 housed in a protective conduit 1704.

Typically, sections of optical cable are on the order of 1 km to 10 km in length. It is contemplated that relatively short sections of monitoring cable, on the order of 100 m or less, could be housed in a field-deployable junction box, for example.

The scope of the claims should not be limited by the details set forth in the examples, but should be given the broadest interpretation consistent with the description as a whole.

What is claimed is:

1. A monitorable hollow core (HC) optical fiber apparatus comprising:
   one or more monitorable HC optical fibers configured to transmit optical signals, each monitorable HC optical fiber comprising one or more hollow core anti-resonant fiber (HC-ARF) segments and one or more monitoring segments alternatingly connected with the HC-ARF segments, each monitoring segment comprising one or more non-HC-ARF constituents,
   wherein each monitoring segment enables a monitoring device to monitor one or more optical properties of the monitorable HC optical fiber using interactions between one or more of the optical signals and the one or more non-HC-ARF constituents, wherein at least one of the monitoring segments is connected to an adjacent one of the HC-ARF segments via a transition segment having a different mode field radius (MFR).

2. The apparatus as claimed in claim 1, wherein a sum of propagation losses and connection losses incurred in each monitorable HC optical fiber is lower than an expected propagation loss of a conventional solid core (SC) optical fiber having a length identical to a length of the monitorable HC optical fiber.

3. The apparatus as claimed in claim 1, further comprising the monitoring device, wherein the monitoring device is capable of monitoring the one or more optical properties using optical time domain reflectometry (OTDR) measurements or pump-probe measurements or both.

4. The apparatus as claimed in claim 1, wherein the one or more optical properties comprise one or more of scatter, loss, wavelength-dependent power, wavelength-dependent dispersion, polarization-dependent loss (PDL), and polarization-mode dispersion (PMD).

5. The apparatus as claimed in claim 1, wherein each monitorable HC optical fiber comprises a plurality of the monitoring segments at a respective plurality of different locations in the monitorable HC optical fiber.

6. The apparatus as claimed in claim 1, wherein the transition segment comprises a plurality of transition sub-segments having a respective plurality of different MFR values.

7. The apparatus as claimed in claim 1, comprising a plurality of the monitorable HC optical fibers and a protective conduit housing the plurality of monitorable HC optical fibers.

8. The apparatus as claimed in claim 1, comprising one or more optical amplifiers configured to amplify the optical signals transmitted on the one or more monitorable HC optical fibers.

9. The apparatus as claimed in claim 8, wherein at least one of the monitorable HC optical fibers comprises a proximal monitoring segment located at a proximal end of the monitorable HC optical fiber and a distal monitoring segment located at a distal end of the monitorable HC optical fiber, wherein an output of one of the optical amplifiers is connected to the proximal monitoring segment, and wherein an input of another one of the optical amplifiers is connected to the distal monitoring segment.

10. A method for monitoring a monitorable hollow core (HC) optical fiber, the method comprising:
    transmitting one or more first optical signals on the monitorable HC optical fiber, wherein the monitorable HC optical fiber comprises one or more HC anti-resonant fiber (HC-ARF) segments and one or more monitoring segments alternatingly connected with the HC-ARF segments, each monitoring segment comprising one or more non-HC-ARF constituents, and wherein at least one of the monitoring segments is connected to an adjacent one of the HC-ARF segments via a transition segment having a different mode field radius (MFR);
    responsive to transmitting the one or more first optical signals, detecting one or more second optical signals on the monitorable HC optical fiber, the one or more second optical signals being primarily dependent on interactions between the one or more first optical signals and the non-HC-ARF constituents of the monitoring segments; and monitoring one or more optical properties of the monitorable HC optical fiber using the one or more first optical signals and the one or more second optical signals.

11. The method as claimed in claim 10, wherein a quantity and respective properties of the one or more monitoring segments are selected such that a sum of propagation losses and connection losses incurred in the monitorable HC optical fiber is lower than an expected propagation loss of a conventional solid core (SC) optical fiber having a length identical to a length of the monitorable HC optical fiber.

12. The method as claimed in claim 10, wherein the one or more optical properties are monitorable using optical time domain reflectometry (OTDR) measurements.

13. The method as claimed in claim 12, further comprising comparing OTDR measurements taken at two or more different times.

14. The method as claimed in claim 10, wherein the one or more optical properties are monitorable using pump-probe measurements.

15. The method as claimed in claim 12, wherein the one or more optical properties comprise one or more of scatter, loss, wavelength-dependent power, wavelength-dependent dispersion, polarization-dependent loss (PDL), and polarization-mode dispersion (PMD).

16. The method as claimed in claim 10, wherein the monitorable HC optical fiber comprises a plurality of the monitoring segments enabling monitoring of the one or more optical properties at a respective plurality of different locations in the monitorable HC optical fiber.

17. A method for manufacturing a monitorable hollow core (HC) optical fiber apparatus, the method comprising:

providing one or more hollow core anti-resonant fiber (HC-ARF) segments of a monitorable HC optical fiber;

providing one or more monitoring segments of the monitorable HC optical fiber, each monitoring segment comprising one or more non-HC-ARF constituents;

alternatingly connecting the HC-ARF segments with the monitoring segments to form the monitorable HC optical fiber, wherein the connecting comprises connecting at least one of the monitoring segments to an adjacent one of the HC-ARF segments via a transition segment having a different mode field radius (MFR), wherein one or more optical properties of the monitorable HC optical fiber are monitorable using interactions between one or more optical signals transmitted on the monitorable HC optical fiber and the non-HC-ARF constituents of the monitoring segments.

18. The method as claimed in claim 17, further comprising selecting a quantity and respective properties of the monitoring segments such that a sum of propagation losses and connection losses incurred in the monitorable HC optical fiber is lower than an expected propagation loss of a conventional solid core (SC) optical fiber having a length identical to a length of the monitorable HC optical fiber.

19. The method as claimed in claim 17, wherein the connecting comprises mechanical splicing.

20. The method as claimed in claim 17, further comprising:

forming the transition segment by connecting together a plurality of transition subsegments having a respective plurality of different MFR values.

* * * * *